United States Patent
Yun et al.

(10) Patent No.: US 9,240,107 B2
(45) Date of Patent: Jan. 19, 2016

(54) APPARATUS FOR RECEIVING AND DISPENSING BILL AND METHOD FOR RECEIVING AND DISPENSING BILL

(71) Applicant: Nautilus Hyosung Inc., Seoul (KR)

(72) Inventors: Su Hyoun Yun, Seongnam-si (KR); Chang Ho Park, Gunpo-si (KR); Jin Young Hwang, Seoul (KR); Young Chul Lee, Anyang-si (KR)

(73) Assignee: NAUTILUS HYOSUNG INC., Seoul (KR)

( * ) Notice: Subject to any disclaimer, the term of this patent is extended or adjusted under 35 U.S.C. 154(b) by 26 days.

(21) Appl. No.: 14/081,906

(22) Filed: Nov. 15, 2013

(65) Prior Publication Data

US 2014/0131163 A1   May 15, 2014

(30) Foreign Application Priority Data

Nov. 15, 2012  (KR) .................. 10-2012-0129508
Dec. 14, 2012  (KR) .................. 10-2012-0146262
Dec. 21, 2012  (KR) .................. 10-2012-0150561

(51) Int. Cl.
*G07F 7/04*    (2006.01)
*G07F 19/00*   (2006.01)
*G07D 11/00*   (2006.01)
*G07D 13/00*   (2006.01)
*G06Q 20/10*   (2012.01)
*B65H 5/26*    (2006.01)
*B65H 31/30*   (2006.01)
*B65G 57/00*   (2006.01)
*B65G 61/00*   (2006.01)
*B65G 57/30*   (2006.01)

(52) U.S. Cl.
CPC .......... *G07F 19/202* (2013.01); *G07D 11/0021* (2013.01); *G07D 11/0024* (2013.01); *G07D11/0084* (2013.01); *G07D 11/0087* (2013.01); *G07D 13/00* (2013.01); *G07F 19/20* (2013.01); *G07F 19/203* (2013.01); *B65G 57/00* (2013.01); *B65G 57/302* (2013.01); *B65G 61/00* (2013.01); *B65H 5/26* (2013.01); *B65H 31/30* (2013.01); *B65H 2301/4223* (2013.01); *B65H 2301/42242* (2013.01); *B65H 2701/1912* (2013.01); *G06Q 20/1085* (2013.01); *G07D 2211/00* (2013.01)

(58) Field of Classification Search
CPC .......... G07D 11/0081; G07D 11/0084; G07D 11/0018; G07D 11/0021; G07D 11/0027; G07D 11/003; G07D 11/0033; G07D 11/0087; G07D 11/009; G07D 11/0093; G07D 11/0096; G07D 7/00; G07D 7/12; G07D 7/20; G07D 13/00; G07D 2207/00; G07D 2211/00; G07F 7/04; G07F 19/20; G07F 19/201; G07F 19/202; G07F 19/203; G07F 19/205; G07F 19/2055; G06Q 20/1085; G06Q 20/042; G06Q 40/00; B65H 2701/1912; B65H 3/44; B65H 39/042; B65H 5/26; B65H 2801/06; B65H 29/40; B65H 29/6609; B65H 2301/44732; B65H 2301/44765; B65H 31/30; B65H 2301/4223; B65H 31/3027; B65H 2301/42242; B65G 57/00; B65G 61/00; B65G 57/302; B65G 2814/0305; G11B 17/225; G11B 17/22; G11B 15/6835; G11B 17/228; G11B 27/002
USPC .................. 194/206, 207; 209/534; 235/379; 414/789.9, 790.2; 271/315, 9.02; 369/30.31; 902/8–17
See application file for complete search history.

(56) References Cited

U.S. PATENT DOCUMENTS

| | | | |
|---|---|---|---|
| 4,462,509 A * | 7/1984 | Adelberger | 221/259 |
| 4,820,909 A | 4/1989 | Kawauchi et al. | |
| 5,139,384 A * | 8/1992 | Tuttobene | 414/281 |
| 5,342,165 A * | 8/1994 | Graef et al. | 414/788.9 |
| 2005/0189693 A1* | 9/2005 | Ko | 271/9.02 |
| 2006/0012114 A1* | 1/2006 | Ko | 271/315 |
| 2006/0097443 A1* | 5/2006 | Choi | 271/207 |

| | | | | |
|---|---|---|---|---|
| 2007/0023988 | A1* | 2/2007 | Abe et al. | 271/3.01 |
| 2008/0142583 | A1 | 6/2008 | Yokoi et al. | |
| 2012/0048876 | A1* | 3/2012 | Deas et al. | 221/1 |

FOREIGN PATENT DOCUMENTS

| | | |
|---|---|---|
| KR | 1991-0008806 | 10/1991 |
| KR | 10-2008-0047278 | 5/2008 |
| KR | 10-2010-0080018 | 7/2010 |
| KR | 10-2010-0080027 | 7/2010 |
| KR | 10-2011-0056945 | 5/2011 |
| KR | 10-2011-0104645 | 9/2011 |
| KR | 10-2012-0119453 | 10/2012 |

OTHER PUBLICATIONS

PCT International Search Report and Written Opinion for PCT/KR2013/010393 Mailed on Feb. 21, 2014, 7 Pages.

* cited by examiner

*Primary Examiner* — Jeffrey Shapiro
(74) *Attorney, Agent, or Firm* — Fenwick & West LLP

(57) ABSTRACT

Disclosed herein are an apparatus for receiving and dispensing bills and a method for receiving and dispensing bills using the apparatus. The apparatus includes: a bill receiving or dispensing port which is provided in an ATM to receive or dispense bills; a carriage unit which clamps the bills received into the port or clamps the bills to be dispensed and transfers the bills to the port; a separation and piling unit which has a separation space in which the received bills wait for being separated individually from each other sheet-by-sheet, and a piling space in which the bills to be dispensed are piled; a carriage transfer unit which moves the carriage unit along a trajectory between the bill receiving or dispensing port and the separation and piling unit; and a controller which controls operation of the carriage unit, the separation and piling unit and the carriage transfer unit.

18 Claims, 21 Drawing Sheets

APPARATUS FOR RECEIVING AND DISPENSING BILL AND METHOD FOR RECEIVING AND DISPENSING BILL

CROSS-REFERENCE TO RELATED APPLICATIONS

This application claims priority to Korean Patent Application No. 10-2012-0129508 filed on Nov. 15, 2012, Korean Patent Application No. 10-2012-0146262 filed on Dec. 14, 2012, and Korean Patent Application No. 10-2012-0150561 filed on Dec. 21, 2012, which are incorporated by reference herein in their entirety.

FIELD OF THE INVENTION

The present invention relates to an apparatus for receiving and dispensing bills and a method for receiving and dispensing bills using the apparatus.

BACKGROUND OF THE INVENTION

Generally, ATMs (automated teller machines) can rapidly, conveniently and automatically provide most financial services, except counseling work, regardless of time.

FIG. 1 is a view showing construction of a bill transfer apparatus of an ATM, according to a conventional technique. As shown in FIG. 1, the ATM according to the conventional technique includes a bill receiving and dispensing unit 10 which receives bills or dispenses bills, a discrimination unit 80 which is provided on a transfer path 5, along which bills received into the bill receiving and dispensing unit 10 or bills to be dispensed therethrough are transferred, to determine whether the bills are normal or not, and a temporary storage unit 90 which temporarily stores bills that are determined as being normal as a result of the determination of the discrimination unit 80.

A bill receiving space 50 is provided in the bill receiving and dispensing unit 10 so that when a shutter 11 opens, the user can insert deposit bills into the bill receiving space 50 or receive withdrawal bills therefrom. A front plate 20, a back plate 30 and a push plate 40 are provided in the bill receiving space 50. The front plate 20 forms a front wall of the bill receiving space 50 and is provided so as to be rotatable around a hinge shaft 21. The back plate 30 is disposed behind the front plate 20 so as to be movable forwards and rearwards and forms a rear wall of the bill receiving space 50. The push plate 40 is provided between the front plate 20 and the back plate 30 so as to be movable forwards and rearwards and partitions the bill receiving space 50 into a deposit space 50a and a withdrawal space 50b.

The deposit space 50a is defined as a space formed between the front plate 20 and the push plate 40. A separation unit 60 is provided below the deposit space 50a so that bills inserted into the deposit space 50a are separated from each other by the separation unit 60 and the separated bills are transferred to the transfer path 5. The withdrawal space 50b is defined as a space formed between the back plate 30 and the push plate 40. A piling unit 70 is provided below the withdrawal space 50b. The piling unit 70 piles rejected-bills that are determined as being abnormal by the discrimination unit 80 or bills that are dispensed when a deposit is canceled or withdrawn.

The separation unit 60 includes a pick-up roller 61 which guides separation of bills from each other sheet-by-sheet, a feed roller 62 which transfers bills separated by the pick-up roller 61 to the transfer path 5, and a guide roller 63 which overlaps the feed roller 62 to prevent several bills from being separated as two or more sheets stuck together.

The piling unit 70 includes a sheet roller 71 which uses a blade-shaped elastic sheet 71a to strike the trailing end of bills that are being transferred and guide the bills into the withdrawal space 50b, and a transfer roller 72 which is provided coaxially with the sheet roller 71 such that the outer circumferential surfaces thereof come into contact with each other.

In the ATM having the above-mentioned construction, the user must put his/her hand into the space inside the shutter 11, in other words, into the bill receiving space 50, to deposit or withdraw bills. Such an ATM is typically called a pocket type ATM. However, in some cultural areas, people are reluctant to put their hands into machines such as pocket type ATMs. In these areas, ATMs that have bill transfer devices to enable for users to deposit or withdraw bills without putting their hands into machines are preferred. Such an ATM is generally called a present type ATM.

The pocket type ATM and the present type ATM have very different structures in terms of the position of the shutter 11, the entire design pertaining to the bill receiving and dispensing unit 10 including the structures of the separation unit 60 and the piling unit 70, and arrangement of the transfer path 5.

Manufacturers for ATMs must produce the two types of ATMs to meet various requirements of consumers. However, because the two types of ATMs are very different from each other, the number of design processes and the amount of equipment required for manufacturing ATMs are increased. Therefore, manpower is wasted and cost to the manufacturer is increased.

SUMMARY OF THE INVENTION

It is, therefore, an object of the present invention to provide an apparatus for receiving and dispensing bills which can conveniently provide present type bill receiving and dispensing services despite using a pocket type ATM structure, and a method for receiving and dispensing bills using the apparatus.

In accordance with a preferred embodiment of the present invention, there is provided an apparatus for receiving and dispensing bills, including: a bill receiving or dispensing port provided in a casing forming an outer shape of an ATM (automated teller machine), the bill receiving or dispensing port receiving or dispensing bills; a carriage unit clamping the bills received into the bill receiving or dispensing port and depositing the bills, or clamping the bills to be dispensed through the bill receiving or dispensing port and transferring the bills to the bill receiving or dispensing port; a separation and piling unit having a separation space in which the received bills wait for being separated individually from each other sheet-by-sheet, and a piling space in which the bills to be dispensed are piled; a carriage transfer unit moving the carriage unit along a trajectory between the bill receiving or dispensing port and the separation and piling unit; and a controller controlling operation of the carriage unit, the separation and piling unit and the carriage transfer unit.

In accordance with another preferred embodiment of the present invention, there is provided a method for receiving and dispensing bills, including: disposing a carriage unit at a position corresponding to a bill receiving or dispensing port of a casing of an ATM (automated teller machine) and waiting for reception of bills; clamping the bills using the carriage unit when the reception of bills is sensed; rotating the carriage unit using a carriage transfer unit and moving the carriage unit to a separation and piling unit for separating the bills individually from each other sheet-by-sheet; and separating the bills, entering a separation space of the separation and piling unit, individually from each other sheet-by-sheet using a separation unit and transferring the separated bills to a transfer path.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, exemplary embodiments of the present invention will be described with reference to the accompanying drawings, in which a repeated description will be omitted or compressed if possible, for clarity.

Figure 1:
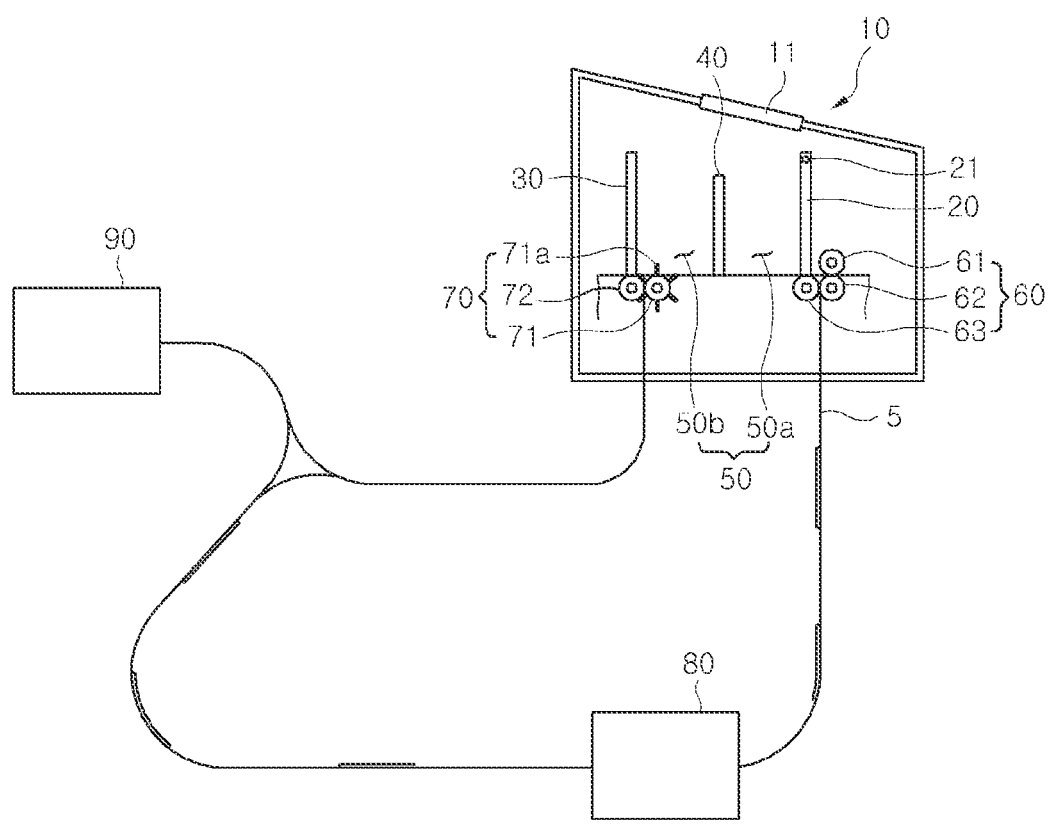
FIG. 1 illustrates the construction of a bill transfer apparatus of an ATM, according to a conventional technique.
Figure 2:
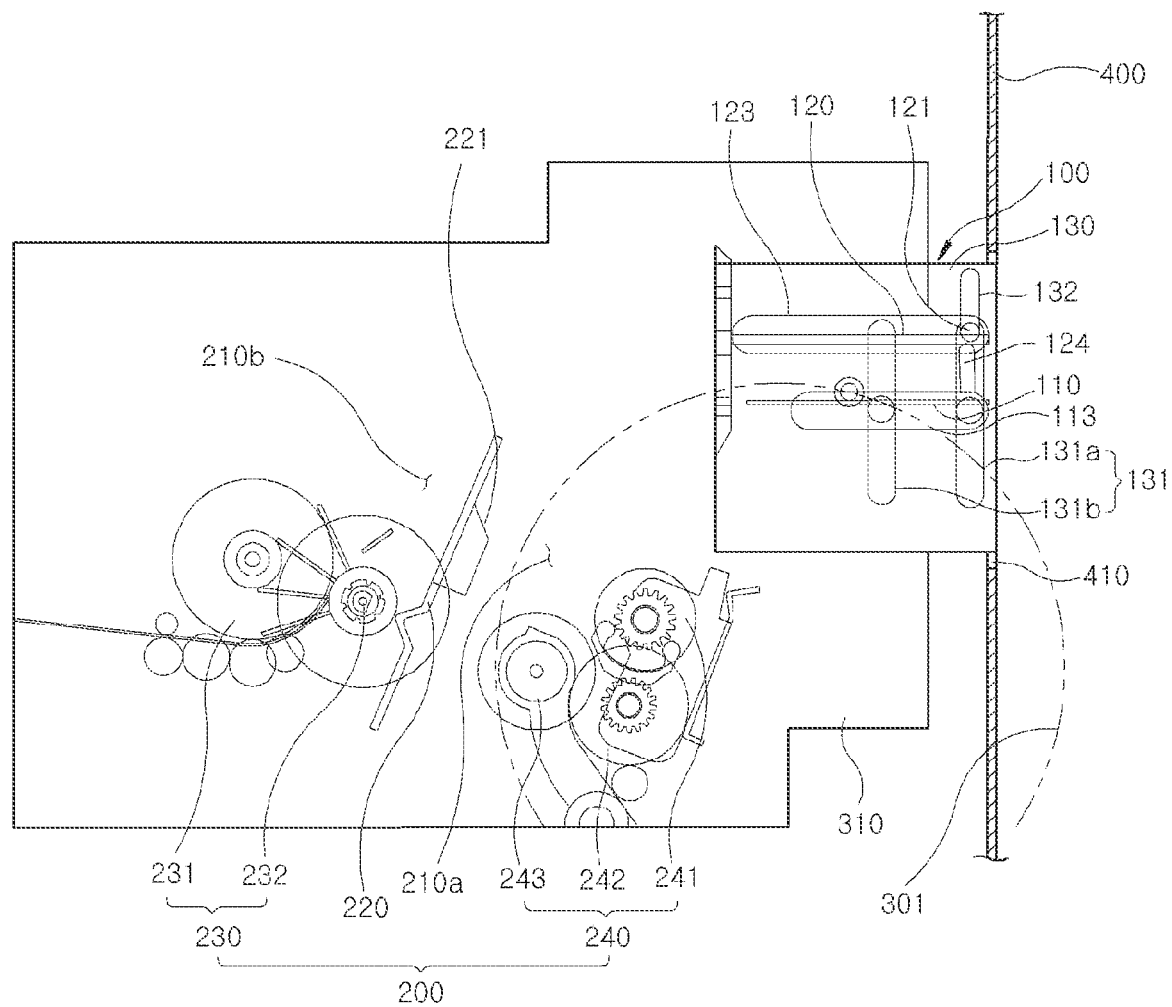
FIG. 2 is a schematic view illustrating an apparatus for receiving and dispensing bills, according to an embodiment of the present invention.
Figure 3:
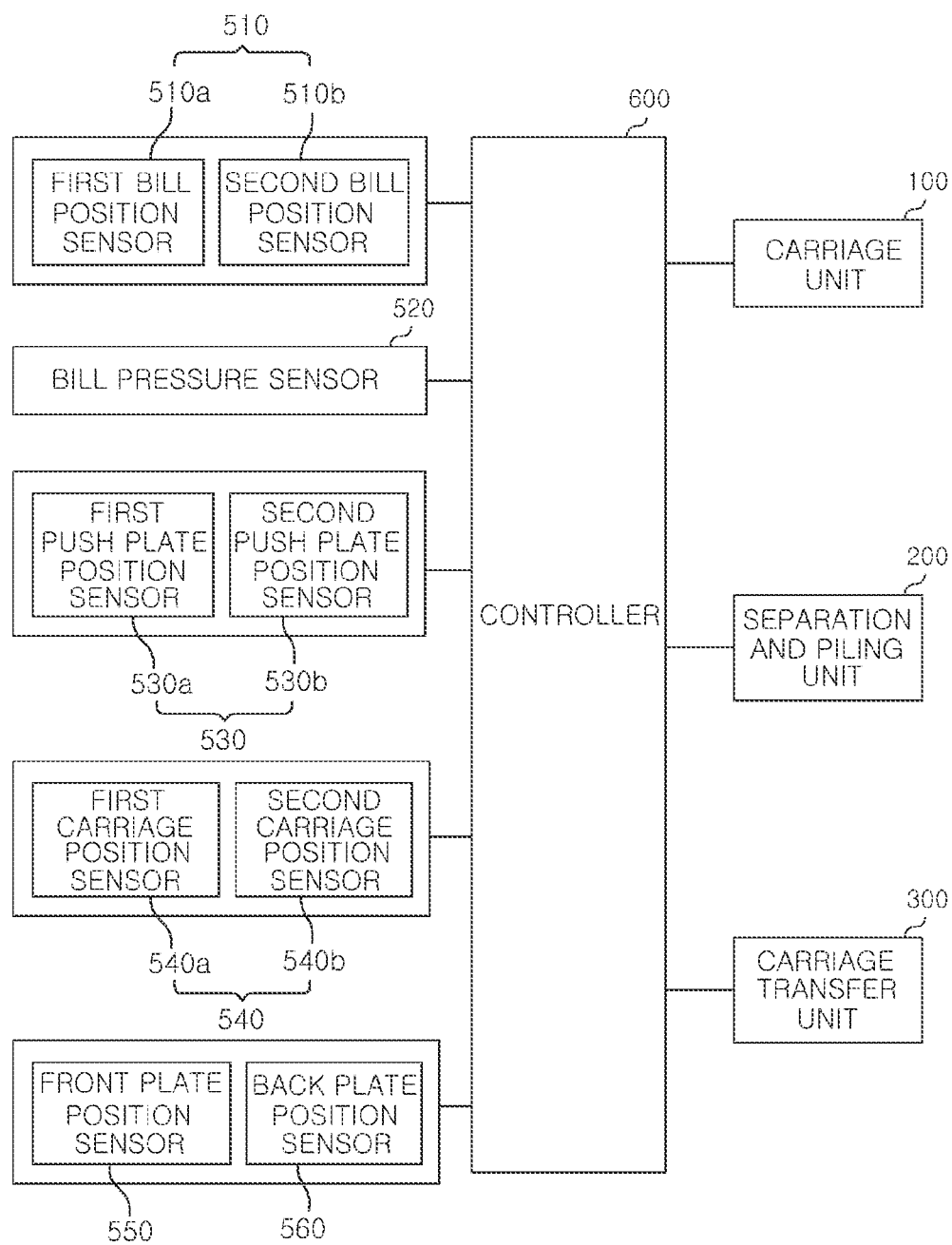
FIG. 3 is a block diagram schematically showing the construction of the bill receiving and dispensing apparatus according to the embodiment of the present invention.
Figure 4A:
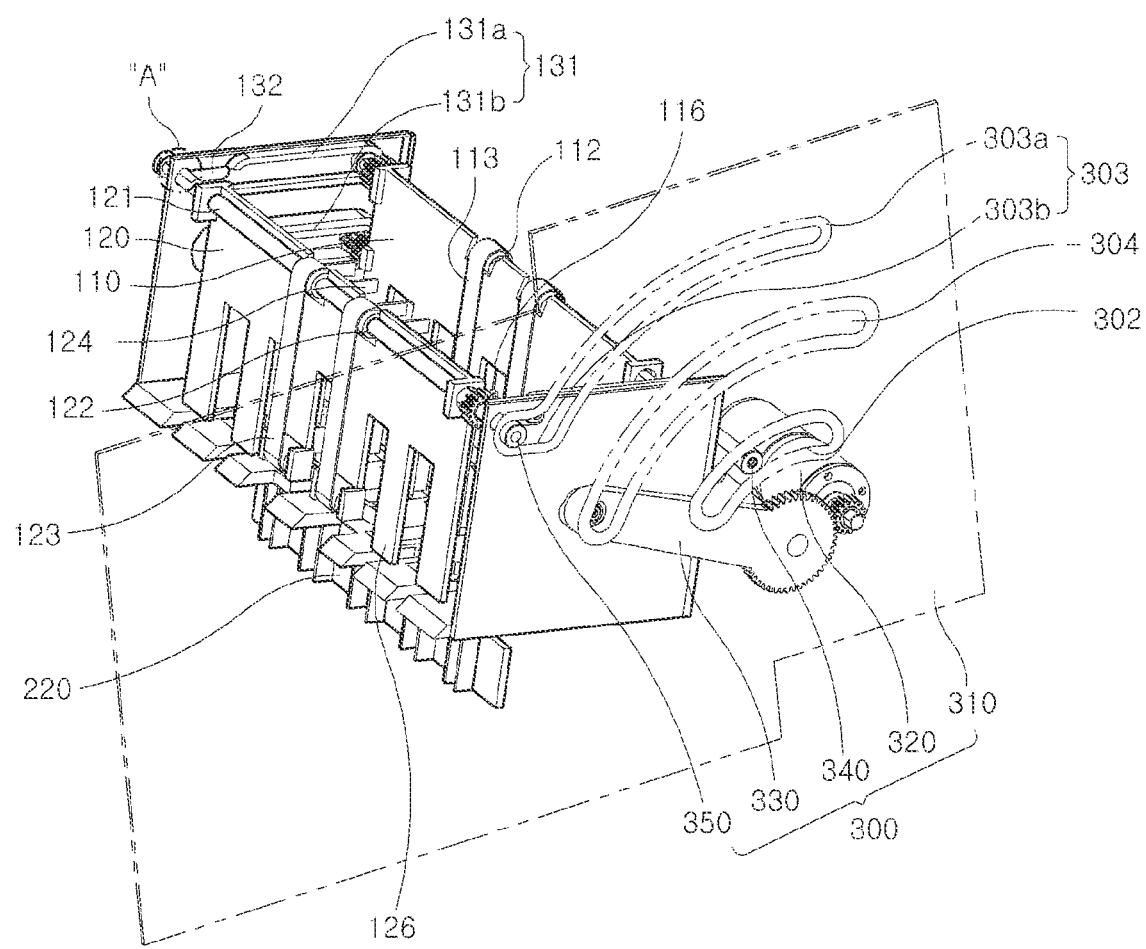
FIG. 4A is a perspective view, from one direction, showing the bill receiving and dispensing apparatus according to the embodiment of the present invention.
Figure 4B:
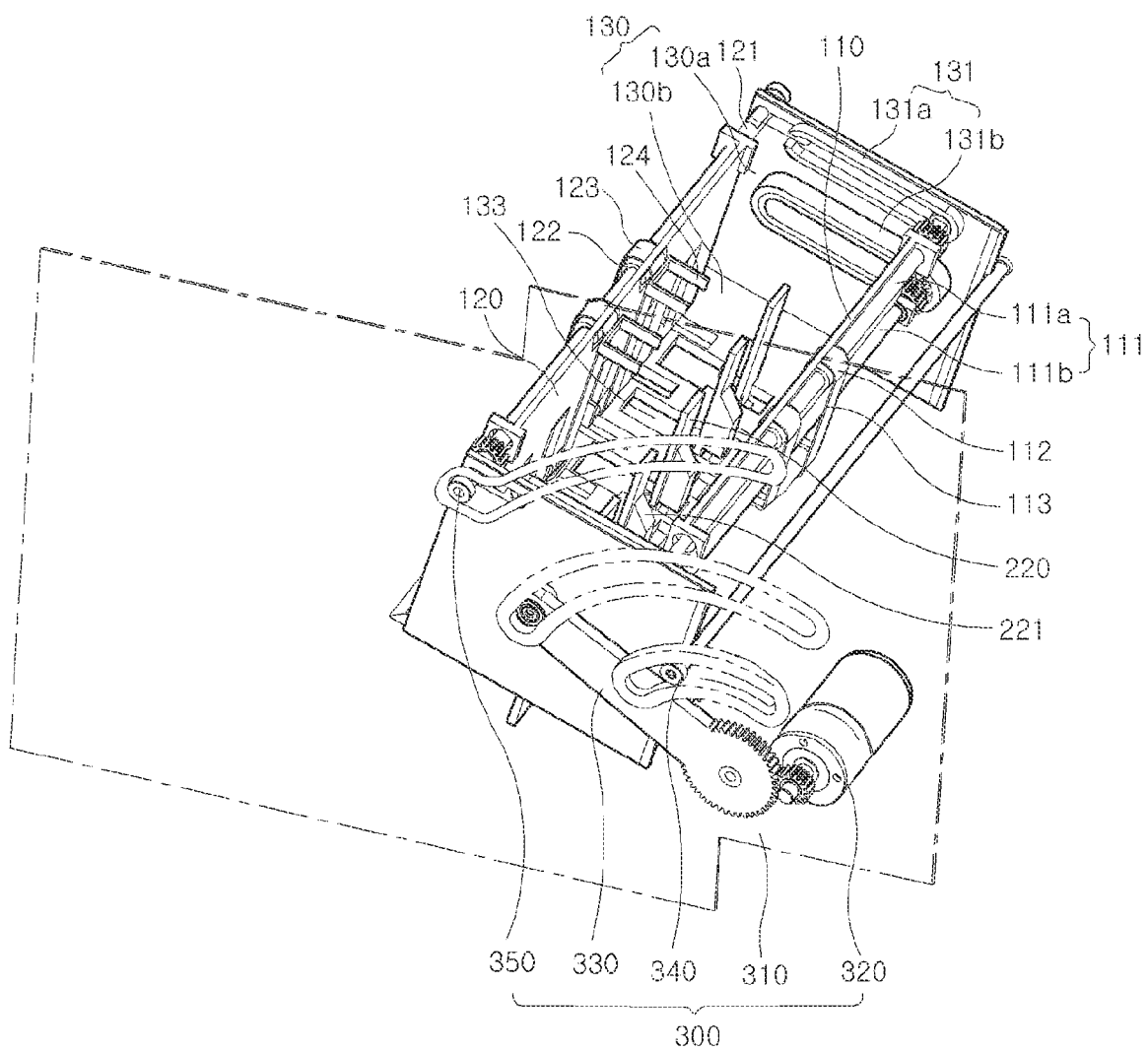
FIG. 4B is a perspective view showing the apparatus of FIG. 4A from another direction.
Figure 4C:
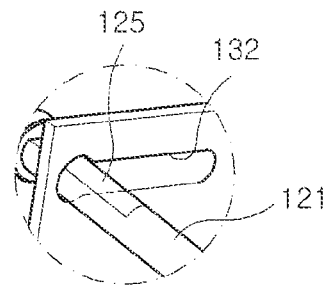
FIG. 4C is an enlarged view of portion A of FIG. 4A.

FIG. 2 is a schematic view illustrating an apparatus for receiving and dispensing bills, according to an embodiment of the present invention. FIG. 3 is a block diagram schematically showing the construction of the bill receiving and dispensing apparatus according to the embodiment of the present invention. FIGS. 4A through 4C are perspective views showing the bill receiving and dispensing apparatus according to the embodiment of the present invention from different directions.

As shown in FIGS. 2 through 4C, the bill receiving and dispensing apparatus according to the embodiment of the present invention includes a carriage unit 100 which clamps bills, a separation and piling unit 200 which separates and piles the bills received into the apparatus or to be dispensed therefrom, a carriage transfer unit 300 which transfers the carriage unit 100, and a controller 600.

In the bill receiving and dispensing apparatus according to the embodiment of the present invention, a space for receiving or dispensing bills is separated from a space for separating or piling bills. A bill receiving or dispensing port 410 is configured such that it is exposed out of an ATM (automated teller machine) to allow a user to conveniently deposit or withdraw bills through the exposed bill receiving or dispensing port 410.

Here, the term "bills" refers to money that is made of a substance such as paper and has predetermined contents printed on the substance or to the like. Furthermore, bills can be deposited or withdrawn in such a way that a single bill or a plurality of bills are received into or dispensed from the ATM. In this embodiment, these will be called bills without distinction of single or plural.

With regard to the drawings illustrating this embodiment, a direction in which bills are inserted into a pocket 130 of the carriage unit 100 to deposit the bills through the bill receiving or dispensing port 410 refers to a bill deposit direction. A direction in which bills are discharged from the pocket 130 of the carriage unit 100 to withdraw the bills from the bill receiving or dispensing port 410 refers to a bill withdrawal direction. A direction perpendicular to the bill deposit direction and the bill withdrawal direction is defined as a perpendicular bill receiving or dispensing direction.

The carriage unit 100 clamps and transfers bills when receiving or dispensing the bills. When the bills are piled or separated, the carriage unit 100 is interlocked with the separation and piling unit 200. For this, when bills are received or dispensed, the carriage unit 100 is disposed at a position corresponding to the bill receiving or dispensing port 410 which is provided in a front surface of a casing 400 of the ATM that is exposed to the outside. When bills are piled or separated, the carriage unit 100 is moved along a trajectory 301 and located at the separation and piling unit 200.

In this embodiment, although the carriage unit 100 is illustrated as being oriented horizontally towards the bill receiving or dispensing port 410, the carriage unit 100 may be provided at an inclination.

The carriage unit 100 includes a pocket 130, a front plate 110 and a back plate 120. The pocket 130 receives bills and has a housing structure to which the front plate 110 and the back plate 120 are movably mounted. The pocket 130 moves along the trajectory 301 formed between the bill receiving or dispensing port 410 and the separation and piling unit 200.

The pocket 130 includes a pair of sidewalls 130a and a bottom plate 130b which connects the sidewalls 130a to each other. The bottom plate 130b is a support plate to enable the sidewalls 130a to be parallel to each other. When the carriage unit 100 is moved to the separation and piling unit 200 of the ATM, the bottom plate 130b supports bills so that the bills can be moved into the separation and piling unit 200.

An insert hole 133 is formed in the bottom plate 130b so that when the carriage unit 100 is moved to the separation and piling unit 200 of the ATM, a push plate 220 which is provided in the separation and piling unit 200 is inserted into the pocket 130 through the insert hole 133.

A bill position sensing unit 510 is provided in the pocket 130 to sense the position of bills. The bill position sensing unit 510 senses the position of bills which are received into the carriage unit 100, in detail, into the pocket 130, or dispensed therefrom and then transmits information about the position of the bills in the pocket 130 to the controller 600. In this embodiment, the bill position sensing unit 510 includes a first bill position sensor 510a which senses bills that are received into the pocket 130 through the bill receiving or dispensing port 410 or dispensed therefrom through it, and a second bill position sensor 510b which senses bills that are transferred from the separation and piling unit 200 into the pocket 130 or from the pocket 130 to the separation and piling unit 200.

The controller 600 controls the operation of the front plate 110 and the back plate 120 based on information provided from the first bill position sensor 510a and the second bill position sensor 510b so that the front plate 110 and the back plate 120 selectively clamp the bills disposed in the pocket 130. For instance, the controller 600 controls the front plate 110 and the back plate 120 in such a way that when the first bill position sensor 510a senses bills that are received into the pocket 130 through the bill receiving or dispensing port 410, the front plate 110 and the back plate 120 move and clamp the bills. Furthermore, when the second bill position sensor 510b senses bills that are transferred from the separation and piling unit 200 into the pocket 130, the controller 600 operates the front plate 110 and the back plate 120 to clamp the bills.

As shown in FIG. 3, the pocket 130 is provided both with a front plate position sensor 550 to sense the position of the front plate 110 and with a back plate position sensor 560 to sense the back plate 120.

The controller 600 controls the operation of the front plate 110 and the back plate 120 based on position information transmitted from the front plate position sensor 550 and the back plate position sensor 560.

Further, a front plate guide rail 131 for guiding movement of the front plate 110 and a slot 132 for guiding movement of the back plate 120 are formed in each sidewall 130a of the pocket 130.

The front plate guide rail 131 includes a first guide rail 131a and a second guide rail 131b. The first guide rail 131a is aligned with the slot 132 in a line. The second guide rail 131b is disposed parallel to the first guide rail 131a.

The front plate 110 is provided so as to be movable along the front plate guide rails 131 of the pocket 130 by means of a front support unit 111. In detail, the front support unit 111 includes a first front moving shaft 111a and a second front moving shaft 111b. The first front moving shaft 111a is provided so as to be movable along the first guide rail 131a. The second front moving shaft 111b is provided so as to be movable along the second guide rail 131b. A pulley 112 and a front moving belt 113 are provided on the front plate 110. The pulley 112 comprises a pair of pulleys 112. The front moving belt 113 is supported by the pulleys 112 and provided in a closed loop shape. The front moving belt 113 functions to transfer bills that come into close contact therewith.

Furthermore, a front slot 116 is formed in the front plate 110 so that the push plate 220 can move through the front plate 110. The front slot 116 extends upwards from a lower edge of the front plate 110 and comprises a plurality of front slots 116 corresponding to the shape of the push plate 220.

A motor (not shown) is connected to the first front moving shaft 111a or the second front moving shaft 111b to move the front plate 110 along the front plate guide rails 131. A motor (not shown) is connected to the pulley 112 to rotate the front moving belt 113.

The back plate 120 of the carriage unit 100 is provided so as to be movable along the slots 132 of the pocket 130 by means of a back plate moving shaft 121. Both ends of the back plate moving shaft 121 are disposed in the respective slots 132 of the pocket 130. A planar guide portion 125 is formed on each of both ends of the back plate moving shaft 121. Each slot 132 has a width less than a diameter of the back plate moving shaft 121. The planar guide portion 125 is a planar surface so that the back plate moving shaft 121 can be inserted into the slot 132. Therefore, the planar guide portion 125 makes surface contact with an inner edge of the slot 132 while the back plate moving shaft 121 moves along the slot 132. Thus, the back plate 120 can be maintained in an upright state without rotating when moving along the slots 132.

Here, a rear end (refer to FIG. 4C) of each slot 132 is greater than the diameter of the back plate moving shaft 121. Due to the above structure, only when the back plate moving shaft 121 is in the rear end of the slot 132 can the back plate moving shaft 121 be rotated. The pocket 130 of the carriage unit 100 is provided with a motor (not shown) for rotating the back plate moving shaft 121. For instance, the back plate moving shaft 121 may be rotated by a gear engagement structure. The back plate 120 is also rotated by the rotation of the back plate moving shaft 121. In this embodiment, the back plate 120 is illustrated as being configured such that it is moved to the rear end of the slot 132 and rotated at a predetermined angle in a direction away from the front plate 110. In this case, a piling space 210b for piling bills is increased so that the piling operation can be facilitated. Further, the performance of the piling operation resulting from a back moving belt 123 which will be explained later can be enhanced by matching the inclination angle of the back plate 120 with an orientation angle of bills that are put into the piling space 210b by the piling unit 230.

Each slot 132 extends in the same direction as the direction in which the first guide rail 131a extends. In this embodiment, the slot 132 is aligned with the first guide rail 131a in the same extension direction as that of the first guide rail 131a. Thus, the back plate 120 can move along the slots 132 while staying parallel to the front plate 110.

A pulley 122 and the back moving belt 123 are provided in the back plate 120. The pulley 122 comprises a pair of pulleys 122. The back moving belt 123 is supported by the pulleys 122 and provided in a closed loop shape. A motor (not show) is connected to the pulleys 122 to rotate the back moving belt 123. The back moving belt 123 functions to transfer bills that come into close contact therewith.

Furthermore, a back slot 126 is formed in the back plate 120 so that the push plate 220 can move through the back plate 120. The back slot 126 extends upwards from a lower edge of the back plate 120 and comprises a plurality of back slots 126 corresponding to the shape of the push plate 220. The back slots 126 are formed at positions corresponding to the respective front slots 116, and each back slot 126 has a shape corresponding to the associated front slot 116. The back slots 126 and the front slots 116 are formed at positions corresponding to the insert hole 133 of the pocket 130.

At least one of the front plate 110 and the back plate 120 is provided with a bill pressure sensor 520.

When bills are compressed between the front plate 110 and the back plate 120, the bill pressure sensor 520 measures a pressure applied to the bills and transmits it to the controller 600. For this, the bill pressure sensor 520 may be provided on both sides of the push plate 220 or, alternatively, on the front plate 110 and the back plate 120. The controller 600 controls the operation of the front plate 110 and the back plate 120 in response to a pressure value transmitted from the bill pressure sensor 520.

For example, when a pressure value transmitted from the bill pressure sensor 520 is greater than a preset value, the controller 600 determines that a clamping operation is completed and stops the movement of the front plate 100 and the back plate 120. When the operation of clamping bills using the front plate 110 and the back plate 120 is completed, the controller 600 controls the operation of the carriage transfer unit 300 so that the carriage unit 100 that clamps the bills is moved to the separation and piling unit 200 or the bill receiving or dispensing port 410.

Meanwhile, a pusher 124 is provided on the back moving belt 123. The pusher 124 can support or push an end of bills disposed in the carriage unit 100. In detail, when the carriage unit 100 clamps bills, the pusher 124 is rotated by the back moving belt 123 in a clockwise direction based on the drawings and supports a trailing end of the bills that are moved in the deposit direction. Thereby, the bills can be effectively moved to a rear portion of the carriage unit 100 (in the left direction of the drawings).

When the carriage unit 100 is moved away from the separation and piling unit 200, the pusher 124 is rotated by the back moving belt 123 in the counterclockwise direction and supports a trailing end of the bills that are moved in the withdrawal direction. Thereby, the bills are aligned evenly and are prevented from being undesirably removed from the carriage unit 100.

Furthermore, when bills are withdrawn from the bill receiving or dispensing port 410, the pusher 124 is rotated by the back moving belt 123 in the counterclockwise direction and pushes the bills. Thereby, the bills can be extracted from the bill receiving or dispensing port 410 by a predetermined distance, thus enabling the user to easily pull out the bills therefrom.

The separation and piling unit 200 includes a separation space 210a in which deposited bills stay before they are separated individually from each other sheet-by-sheet, and a piling space 210b in which bills to be withdrawn are piled. The separation space 210a is disposed ahead of the push plate 220. The piling space 210b is disposed behind the push plate 220.

In detail, when the carriage unit 100 enters the separation and piling unit 200, in the separation and piling unit 200, the separation space 210a is formed between the push plate 220 and the front plate 110, and the piling space 210b is formed between the push plate 220 and the back plate 120. Further, the push plate 220 for guiding movement of bills is installed in the separation and piling unit 200 so as to be movable in the front-rear direction (in the left-right direction of FIG. 2). A push-plate-position sensing unit 530 for sensing the position of the push plate 220 is provided in the separation and piling unit 200.

The push-plate-position sensing unit 530 includes a first push plate sensor 530a which is provided in the piling space 210b of the separation and piling unit 200, and a second push plate sensor 530b which is provided in the separation space 210a of the separation and piling unit 200. The first push plate sensor 530a senses the push plate 220 which is moved to the piling space 210b when bills enter the separation space 210a. The second push plate sensor 530b senses the push plate 220 which is moved to the separation space 210a when bills enter the piling space 210b.

The push plate 220 is provided so as to be movable in the front-rear direction of the separation and piling unit 200, thus guiding bills which are moved to the separation and piling unit 200. The push plate 220 receives drive force from a motor (not shown) and moves along a separate guide rail (not shown) which is oriented in the front-rear direction of the separation and piling unit 200.

One surface of the push plate 220 is a surface on which bills are piled when they are withdrawn. An inclined guide surface 221 that has a stepped structure protrudes from the other surface of the push plate 220. Here, when the carriage unit 100 enters the separation and piling unit 200, the inclined guide surface 221 guides bills disposed in the carriage unit 100 to the separation space 210a of the separation and piling unit 200. When the carriage unit 100 is separated from the separation and piling unit 200, the inclined guide surface 221 functions as a support surface for the bills.

In the separation and piling unit 200, the piling unit 230 is provided at an inlet side of the piling space 210b, and a separation unit 240 is provided at an outlet side of the separation space 210a. The piling unit 230 strikes the trailing end of bills that are guided along a transfer path (not shown) so as to guide piling of the bills in the piling space 210b. The piling unit 230 includes a transfer roller 231 and a sheet roller 232. The transfer roller 231 guides bills, which are transferred along the transfer path, to the sheet roller 232. The sheet roller 232 includes a blade-shaped elastic sheet which strikes the trailing end of the bills that enter the piling space 210b so that the bills can be piled in the piling space 210b.

The separation unit 240 of the separation and piling unit 200 functions to separate the bills, which have been transferred to the separation space 210a, individually from each other sheet-by-sheet and transfer them. The separation unit 240 includes a pick-up roller 241, a feed roller 242 and a guide roller 243. The pick-up roller 241 guides the separation of bills. The feed roller 242 transfers the sheets of bills that have been separated by the pick-up roller 241 to a transfer path (not shown) for discrimination. The guide roller 243 overlaps the feed roller 242 to prevent the bills from being separated as two or more sheets stuck together.

Meanwhile, to provide a path along which bills can be moved from the carriage unit 100 to the separation space 210a when the carriage unit 100 enters the separation and piling unit 200, the back plate 120 of the carriage unit 100 is rotated by a predetermined angle around the back plate moving shaft 121.

A variety of rotating means for rotating the back plate 120 by a predetermined angle can be connected to the back plate 120. For example, the back plate 120 may be rotated by a predetermined angle in such a way that the back plate moving shaft 121 is rotated by a separate motor or, alternatively, the back plate 120 may rotate around the back plate moving shaft 121 by moving an end of the back plate 120 along a separate guide rail.

The carriage transfer unit 300 moves the carriage unit 100 along the trajectory 301 between the bill receiving or dispensing port 410 and the separation and piling unit 200. The position of the carriage unit 100 that is moving can be sensed by the carriage position sensing unit 540.

The carriage position sensing unit 540 includes a first carriage position sensor 540a which is disposed around the trajectory 301 adjacent to the separation and piling unit 200 and senses the carriage unit 100 that is located in the separation and piling unit 200, and a second carriage position sensor 540b which is disposed around the trajectory 301 adjacent to the bill receiving or dispensing port 410 and senses the carriage unit 100 that is connected to the bill receiving or dispensing port 410.

The controller 600 receives information about the position of the carriage unit 100 on the trajectory 301 from the first carriage position sensor 540a and the second carriage position sensor 540b and controls the operation of the carriage transfer unit 300.

The carriage transfer unit 300 includes guide plates 310, a drive motor 320, a carriage arm 330, a carriage guide roller 340 and a back plate guide roller 350.

The guide plates 310 are disposed on opposite sides of the carriage unit 100 and support the carriage unit 100. Trajectory slots 302, 303 and 304 which define the trajectory 301 are formed in each guide plate 310 so as to guide the movement of the carriage unit 100.

The trajectory 301 is an arc-shaped trajectory which circularly guides the movement of the carriage unit 100. In this embodiment, although the trajectory 301 along which the carriage unit 100 moves has been illustrated as being an arc-shaped trajectory, the present invention is not limited to this structure. The trajectory 301 can have any shape, so long as it can effectively move the carriage unit 100. For example, the trajectory 301 may be a curved trajectory having a wave shape, as well as a curved trajectory having a circular shape, or a linear trajectory.

The guide plate 310 has therein a carriage trajectory slot 302 which guides movement of the carriage guide roller 340 which will be explained later, a back plate trajectory slot 303 which guides movement of the back plate guide roller 350 which will be explained later, and an arm trajectory slot 304 which guides movement of the carriage arm 330. In this embodiment, although the carriage trajectory slot 302, the back plate trajectory slot 303 and the arm trajectory slot 304 each is illustrated as being a slot formed by protruding a portion of the guide plate 310 inwards, the spirit of the present invention is not limited to this structure. For instance, the trajectory slots 302, 303 and 304 may be formed by perforation, or each may have a rail structure.

The carriage trajectory slot 302 is provided to guide the carriage guide roller 340 along a circular curved trajectory. The arm trajectory slot 304 is provided to guide the carriage arm 330 along a circular curved trajectory that has the same rotation center as that of the carriage trajectory slot 302. Thereby, the carriage unit 100 can be maintained in a constant position while moving along the carriage transfer unit 300. In this embodiment, although a radius of rotation of the carriage trajectory slot 302 is illustrated as being shorter than that of the arm trajectory slot 304, the spirit of the present invention is not limited to this structure.

Among the trajectory slots 302, 303 and 304, the back plate trajectory slot 303 is disposed at a position farthest from the rotation center. The back plate trajectory slot 303 includes a back plate curved-trajectory slot 303a which is a circular curved trajectory and guides the back plate guide roller 350, and a back plate deployment-trajectory slot 303b which guides the back plate guide roller 350 such that when the carriage unit 100 enters the separation and piling unit 200, the back plate guide roller 350 moves along the slot 132.

When the carriage arm 330 rotates along the arm trajectory slot 304 in a counterclockwise direction, the back plate guide roller 350 successively moves along the back plate curved-trajectory slot 303a and back plate deployment-trajectory slot 303b. Thereby, the back plate moving shaft 121 of the back plate 120 can be moved to a corresponding end of the slot 132. When the back plate guide roller 350 moves along the back plate deployment-trajectory slot 303b, the carriage unit 100 is rotated by a predetermined angle around a junction between the carriage arm 330 and the pocket 130 after entering the separation and piling unit 200.

Here, the back plate curved-trajectory slot 303a is a circular curved trajectory which has the same rotation center as that of the carriage trajectory slot 302 and the arm trajectory slot 304.

The drive motor 320 is a drive source to provide rotating force to the carriage unit 100. An output shaft of the drive motor 320 rotates the carriage arm 330 through a power transmission construction such as gears. In this embodiment, although the drive motor 320 has been illustrated as being mounted to the guide plate 310 of the carriage transfer unit 300, this is merely exemplary. For example, the drive motor 320 may be mounted to the separation and piling unit 200 or any other elements of the bill receiving and dispensing apparatus.

The carriage arm 330 receives the rotating force from the drive motor 320 and rotates the carriage unit 100. A first end of the carriage arm 330 is rotatably connected to a side part of the carriage unit 100, in detail, to a sidewall of the pocket 130 of the carriage unit 100. A second end of the carriage arm 330 is connected to the output shaft of the drive motor 320 by the power transmission construction.

The carriage guide roller 340 is connected to a guide shaft which is provided on a side part of the pocket 130. The carriage guide roller 340 moves along the carriage trajectory slot 302 that is formed in the guide plate 310.

The back plate guide roller 350 is provided on an end of the back plate moving shaft 121 that is fixed to the back plate 120. The back plate guide roller 350 moves along the back plate trajectory slot 303 that is formed in the guide plate 310.

When the carriage unit 100 is rotated in the separation and piling unit 200 towards the bill receiving or dispensing port 410, the carriage arm 330 is rotated in the clockwise direction by the drive motor 320. Thereby, the carriage guide roller 340 moves in the clockwise direction along the carriage trajectory slot 302, and the back plate guide roller 350 moves in the clockwise direction along the back plate curved-trajectory slot 303a.

When the carriage unit 100 is rotated from the bill receiving or dispensing port 410 towards the separation and piling unit 200, the carriage arm 330 is rotated in the counterclockwise direction by the drive motor 320. Thereby, the carriage guide roller 340 is moved in the counterclockwise direction along the carriage trajectory slot 302, and the back plate guide roller 350 is rotated in the counterclockwise direction along the back plate curved-trajectory slot 303a. When the carriage guide roller 340 is further moved in the counterclockwise direction, the back plate moving shaft 121 is moved in the counterclockwise direction along the slot 132 so that space for insertion of bills from the inlet side of the piling space 210b can be ensured.

In this embodiment, although the back plate moving shaft 121 of the back plate 120 has been illustrated as being able to move back and forth along the slot 132 in conjunction with the carriage unit 100 when the carriage unit 100 is rotated in the clockwise direction and the counterclockwise direction, the method of moving the back plate 120 back or rotating it using the back plate moving shaft 121 is not limited to the above-mentioned method. For instance, a separate actuator may be used to move the back plate 120 along the slot 132 or rotate it.

Furthermore, in this embodiment, although the movement of the carriage unit 100 has been illustrated as being embodied by the several trajectory slots 302 and 304, the spirit of the present invention is not limited to this. That is, the carriage unit 100 may be moved along a single trajectory slot.

Moreover, in this embodiment, although the carriage unit 100 is illustrated as being rotated by the carriage arm 330, the present invention is not limited to this construction. The carriage unit 100 is moved by a separate drive means. For instance, the present invent may be configured in such a way that a separate drive device (e.g., a pinion gear and a motor) which moves along the trajectory 301 is mounted to the carriage unit 100, and an interlocking unit (e.g., a rack gear) which is interlocked with the drive device is provided on the guide plate 310.

When information of the position of bills received into the bill receiving or dispensing port 410 is transmitted from the position sensor 510a, the controller 600 moves at least one of the front plate 110 and the back plate 120 of the carriage unit 100 to clamp the bills. In this embodiment, as shown in FIG. 5B, the front plate 110 is moved towards the back plate 120 to clamp the bills. When it is determined based on a pressure value transmitted from the bill pressure sensor 520 that the bills are completely clamped between the front plate 110 and the back plate 120, the controller 600 applies an actuation signal to the carriage transfer unit 300 to move the carriage unit 100 to the separation and piling unit 200. When the first carriage position sensor 540a detects the carriage unit 100 that is located in the separation and piling unit 200, the controller 600 moves the bills from the carriage unit 100 to the separation space 210a of the separation and piling unit 200, and the separation unit 240 separates the bills from each other individually sheet-by-sheet.

Further, when it is determined that the carriage unit 100 is located in the separation and piling unit 200 and the operation of piling the bills is completed based on a value transmitted from the bill pressure sensor 520 or a bill piling signal of the piling unit 230, the controller 600 applies an actuation signal to the carriage transfer unit 300 and moves the carriage unit 100. Here, after the carriage unit 100 is rotated from the separation and piling unit 200 by a predetermined degree or more, the controller 600 applies an actuation signal to the front plate 110 and the back plate 120, thus clamping the bills. In this embodiment, during the withdrawal process (refer to FIGS. 6B through 6D), although the carriage unit 100 has been illustrated as moving before the bills are clamped, the spirit of the present invention is not limited to this. The front plate 110 and the back plate 120 may move and clamp the bills before the carriage unit 100 rotates. Furthermore, when the second carriage position sensor 540b detects the carriage unit 100 that is located in the bill receiving or dispensing port 410, the controller 600 rotates the front moving belt 113 and the back moving belt 123 so that the bills are moved in the bill withdrawal direction and exposed to the outside through the bill receiving or dispensing port 410, thus allowing the user to pull out the bills.

Hereinafter, the operation of the bill receiving and dispensing apparatus according to the embodiment of the present invention having the above-mentioned construction will be explained.

In the following description, for the sake of description, the right side of each drawing is designated as the front, the left side is the rear, the upper side is the upper, and the lower side is the lower. Depending on the position or conditions of each element in each drawing, the definition of the direction of the element may be changed. For example, the lower end of the front plate guide rail 131 of FIG. 5A means the same as the front end of the front plate guide rail 131 of FIG. 5E.

FIGS. 5A through 5E are operating condition diagrams showing a bill receiving process of the bill receiving and dispensing apparatus according to the embodiment of the present invention. The bill receiving process of the bill receiving and dispensing apparatus according to the embodiment of the present invention will be explained in detail below.

Figure 5A:
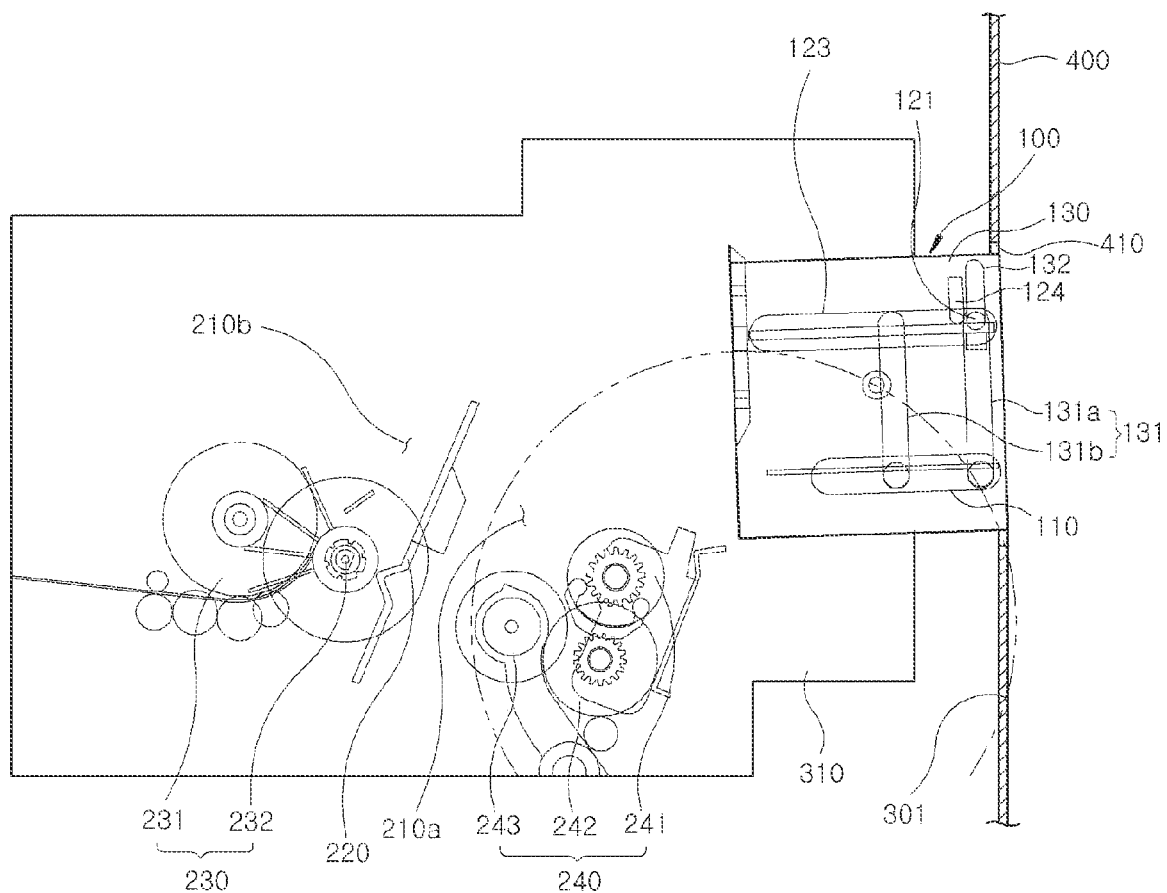
FIGS. 5A through 5E are operating condition diagrams showing a bill receiving process of the bill receiving and dispensing apparatus according to the embodiment of the present invention.
Figure 5B:
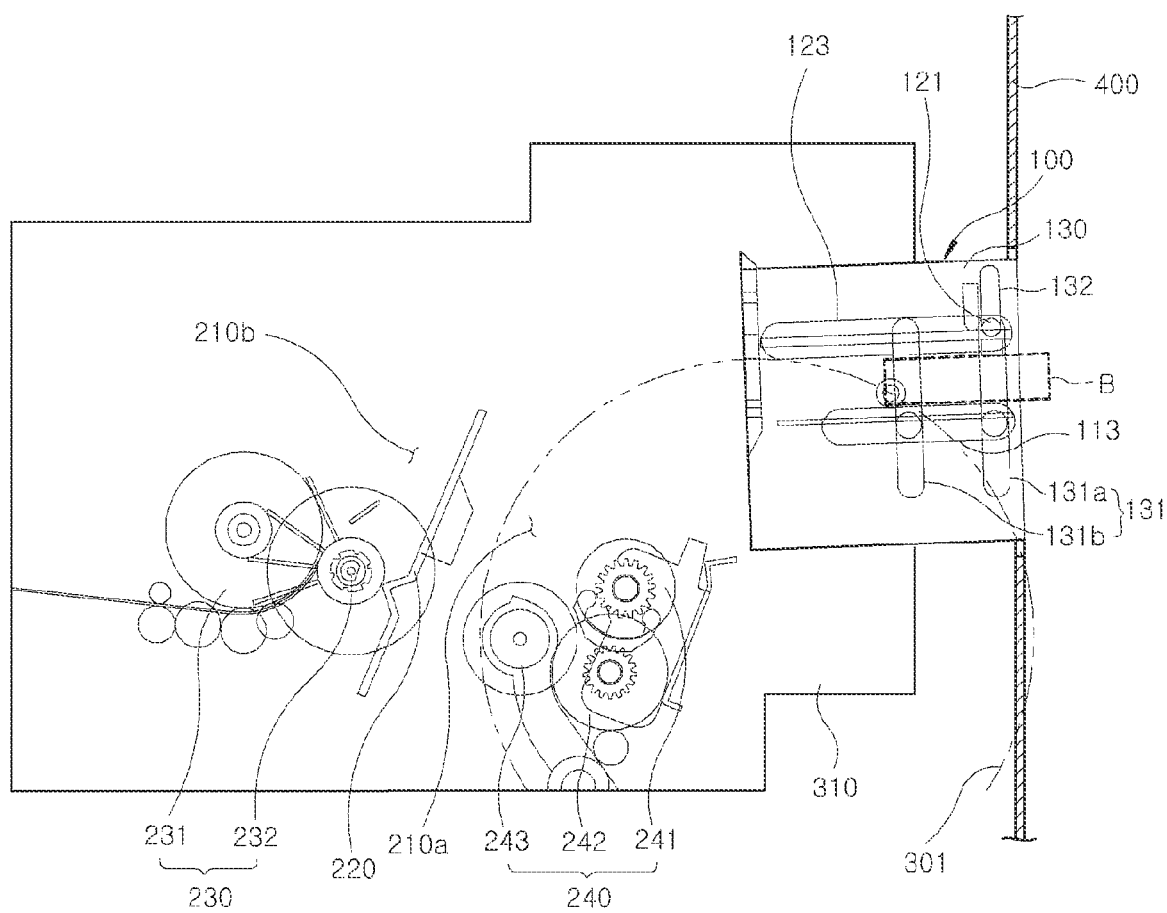

FIG. 5A illustrates conditions in which a shutter of the bill receiving or dispensing port 410 opens and the carriage unit 100 is waiting for the deposit of bills. In this state, the front plate 110 of the carriage unit 100 is moved to the lower end of the front plate guide rail 131 to ensure space for receiving bills between the back plate 120 and the front plate 110. Here, the back plate 120 is disposed below the slot 132.

The front plate guide rail 131 and the slot 132 extend in the same direction. The front plate 110 is guided by the two guide rails 131a and 132b. The back plate 120 is guided in such a way that the planar guide portion 125 comes into contact with the inner edge of the slot 132. In the above state, the front plate 110 and the back plate 120 can be maintained parallel to each other.

At this time, the carriage position sensing unit 540 transmits a signal to the controller 600 that the carriage unit 100 is disposed in the bill receiving or dispensing port 410. The controller 600 controls the carriage unit 100 so that the front plate 110 is disposed as shown in FIG. 5A.

FIG. 5B illustrates conditions in which bills B that have been inserted into the carriage unit 100 are clamped by the front plate 110 and the back plate 120. In detail, after the shutter of the bill receiving or dispensing port 410 has opened, when the bills B are inserted into space between the front plate 110 and the back plate 120 through the inlet of the carriage unit 100, the front plate 110 is moved towards the upper end of the front plate guide rail 131. As a result, the bills B are compressed between the back plate 120 and the front plate 110.

The controller 600 closes the shutter in response to a predetermined signal input resulting from manipulation of the user or after a predetermined time has passed. While closing the shutter, the controller 600 controls the carriage unit 100 to move the front plate 110. If a pressure value of the bills B that is transmitted from the bill pressure sensor 520 is greater than a preset pressure value, it is determined that the clamping is completed, and further movement of the front plate 110 is limited.

Figure 5C:
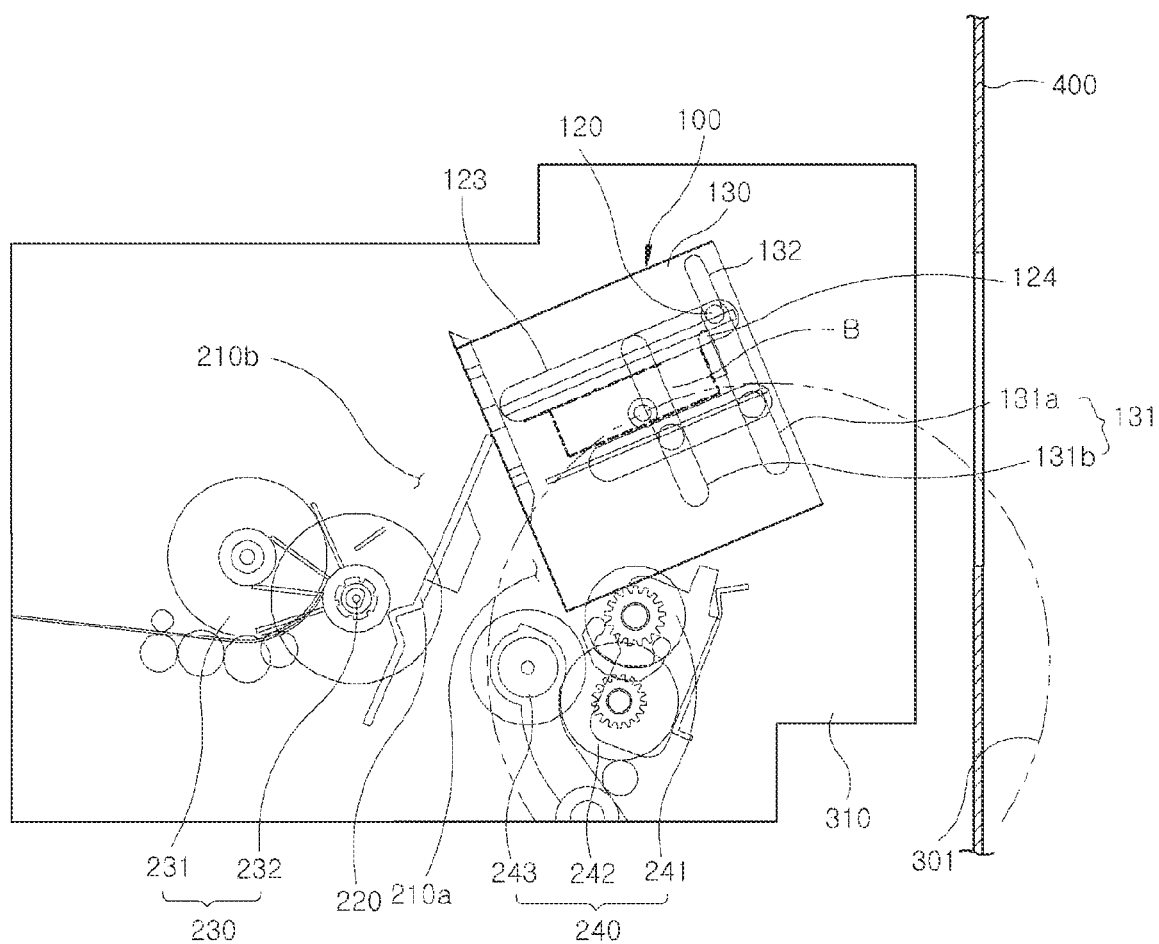

FIG. 5C illustrates conditions in which the carriage unit 100 is rotated along the trajectory 301 by a predetermined angle towards the separation and piling unit 200.

The controller 600 controls the carriage transfer unit 300 and rotates the carriage arm 330 after the front plate 110 and the back plate 120 clamp the bills B. Here, the carriage guide roller 340 and the back plate guide roller 350 which are provided in the pocket 130 respectively move along the carriage trajectory slot 302 and the back plate curved-trajectory slot 303a. Therefore, an angle of the carriage unit 100 relative to the carriage arm 330 can be maintained when the carriage unit 100 is being rotated.

Here, the controller 600 can rotate the front moving belt 113 and the back moving belt 123 so that the bills that are clamped are moved by a predetermined distance towards the rear part of the carriage unit 100. A rotation amount of the back moving belt 123 is controlled to a degree at which the pusher 124 can push an end of the bills B.

Figure 5D:
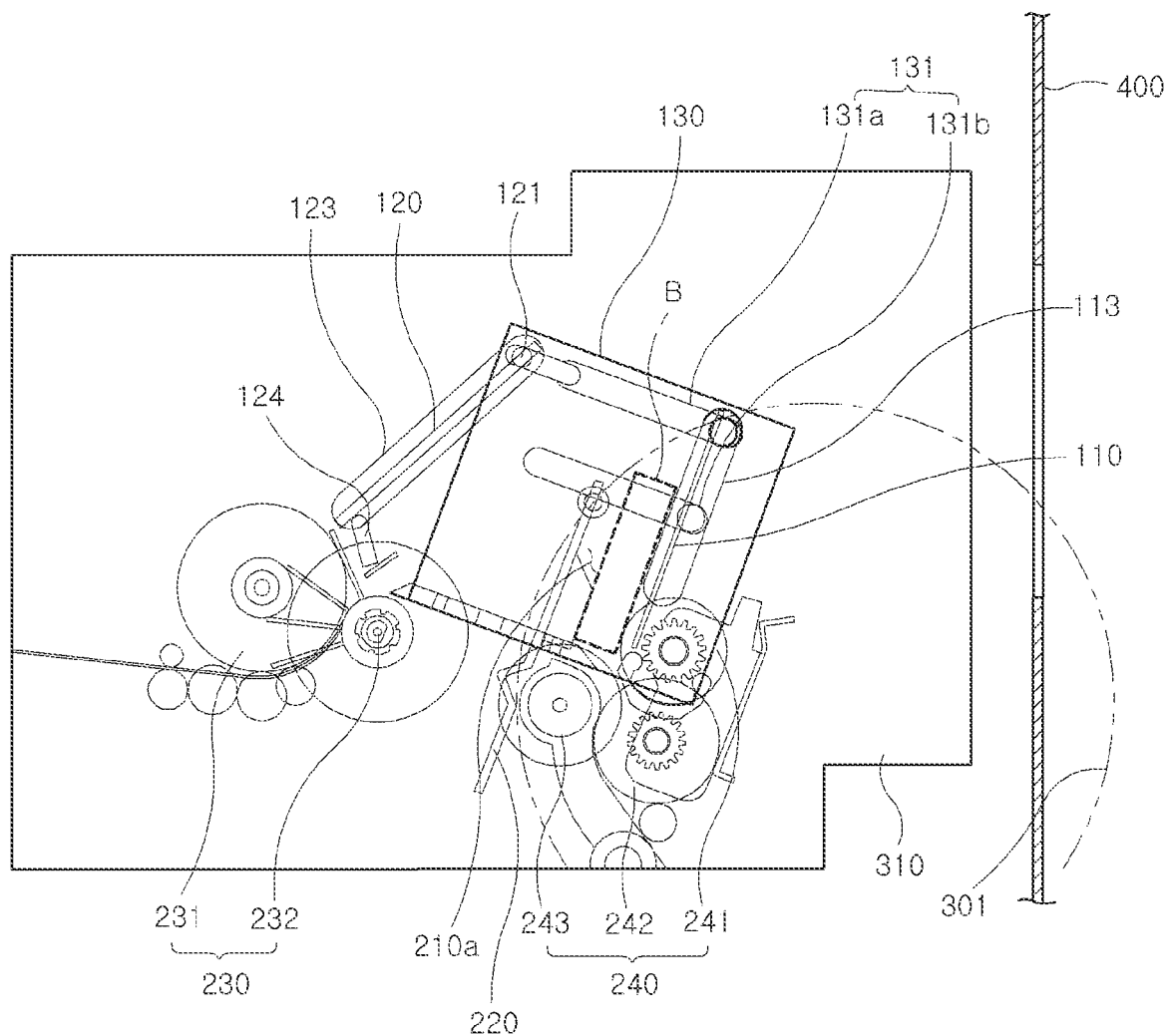

FIG. 5D illustrates conditions in which the carriage unit 100 enters the separation and piling unit 200.

When the state of FIG. 5C is changed to the state of FIG. 5D, the push plate 220 protrudes into the pocket 130 through the insert hole 133 of the pocket 130. Further, the front plate 110 is moved to the lower end of the front plate guide rail 131. The back plate 120 is moved to the rearmost end of the slot 132 under the guidance of the back plate deployment-trajectory slot 303b and is rotated rearwards around the back plate moving shaft 121. As the back plate 120 is rotated rearwards, bills to be rejected, which will be explained later herein, can easily enter the piling space 210b.

Here, with regard to the pocket 130, the carriage arm 330 and the carriage guide roller 340 are respectively rotated along the arm trajectory slot 304 and the carriage trajectory slot 302. When the back plate guide roller 350 is moved along the back plate deployment-trajectory slot 303b that extends in a different direction from that of the arm trajectory slot 304 and the carriage trajectory slot 302, the pocket 130 can be rotated by a predetermined angle. FIG. 5D illustrates conditions in which the pocket 130 has been rotated by a predetermined angle. The above-stated rearward rotation of the back plate 120 is conducted when the rotation of the pocket 130 is completed.

At this time, the bills B that have been clamped by the front plate 110 and the back plate 120 are guided by the push plate 220 which enters the pocket 130 through the insert hole 133, particularly, by the inclined guide surface 221, and then located between the push plate 220 and the front plate 110.

To reliably guide the bills B towards the front part of the push plate 220, the push plate 220 is configured such that, when the carriage unit 100 enters the separation and piling unit 200, the end of the push plate 220 slides a predetermined distance along the back plate 120 or comes into contact with the back plate 120. Alternatively, after the end of the push plate 220 is inserted into the back slots 126 of the back plate 120, the bills B may be disposed between the push plate 220 and the front plate 110 by rearward movement of the back plate 120 or forward movement of the push plate 220. To make the above-mentioned operation possible, the controller 600 disposes the push plate 220 at a preset position before moving it.

The controller 600 controls a drive device for the front plate 100 and a drive device for the back plate 120 such that the carriage unit 100 can be operated in the above-mentioned manner.

The carriage position sensing unit 540 senses that the carriage unit 100 completely enters the separation and piling unit 200, and then transmits a signal to the controller 600.

Furthermore, when the movement of the carriage unit 100 into the separation and piling unit 200 is completed, the controller 600 moves the front plate 110 and the push plate 220 towards the separation unit 240 such that the bills B are located at a separation position. Here, the push plate 220 is controlled such that it continuously compresses the bills B. The controller 600 controls a displacement of the push plate 220 in response to a value sensed by the bill pressure sensor 520.

Figure 5E:
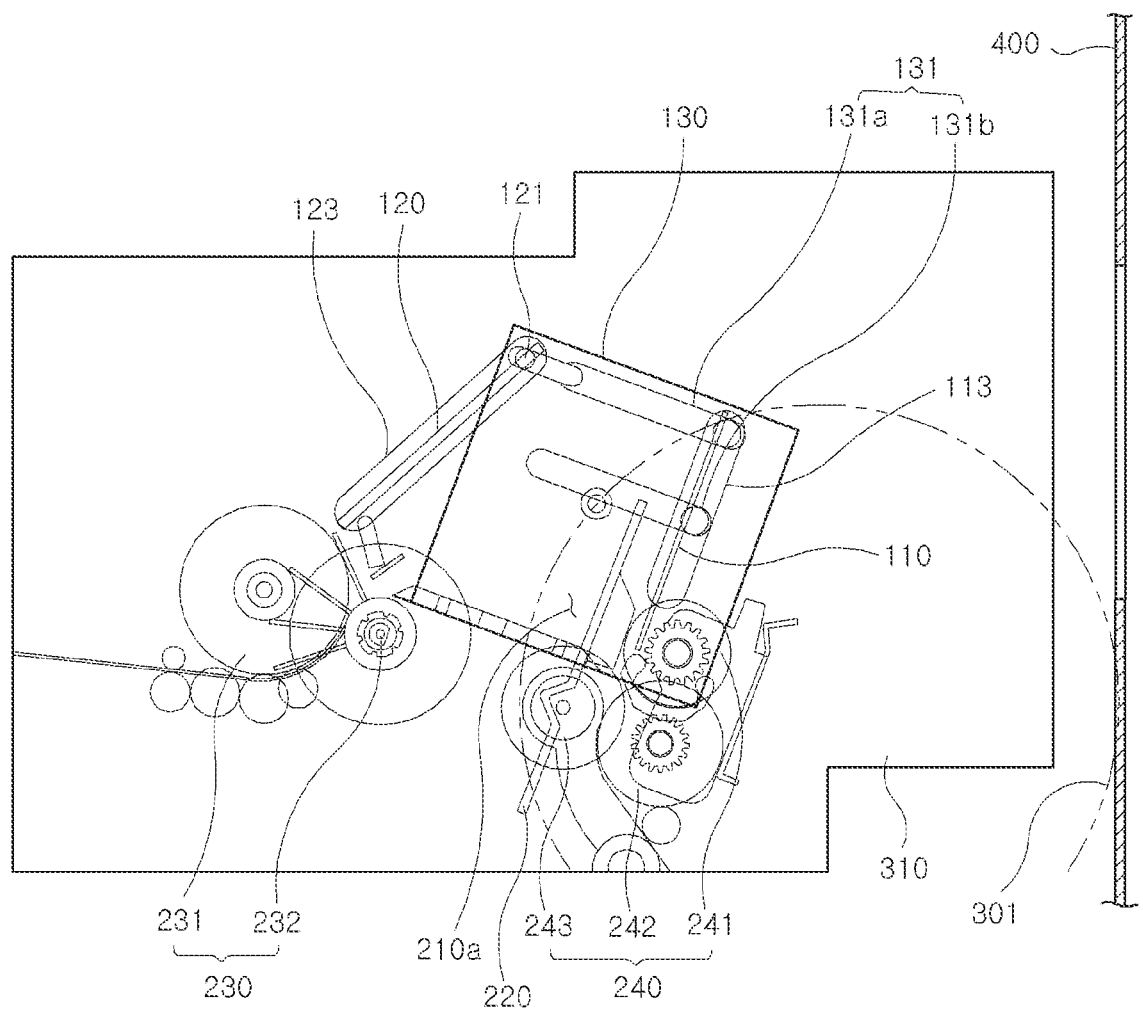

FIG. 5E illustrates conditions in which the bills in the separation space 210a are completely separated individually from each other sheet-by-sheet by the separation unit 240. The bills that have entered the separation and piling unit 200 are individually separated from each other sheet-by-sheet by the separation unit 240 in the separation space 210a while the bills are pushed by the push plate 220.

The pick-up roller 241 of the separation unit 240 induces the separation of the bills. The feed roller 242 transfers bills that have been separated by the pick-up roller 241 to the transfer path for discrimination. The guide roller 243 overlaps the feed roller 242 and prevents the bills from being stuck together when being separated.

After the separation process is completed, the push plate 220 may come into contact with the pick-up roller 241, as shown in FIG. 5E.

FIGS. 6A through 6D are operating condition diagrams showing a bill dispensing process of the bill receiving and dispensing apparatus according to the embodiment of the present invention. The bill dispensing process of the bill receiving and dispensing apparatus according to the embodiment of the present invention will be explained in detail below.

Figure 6A:
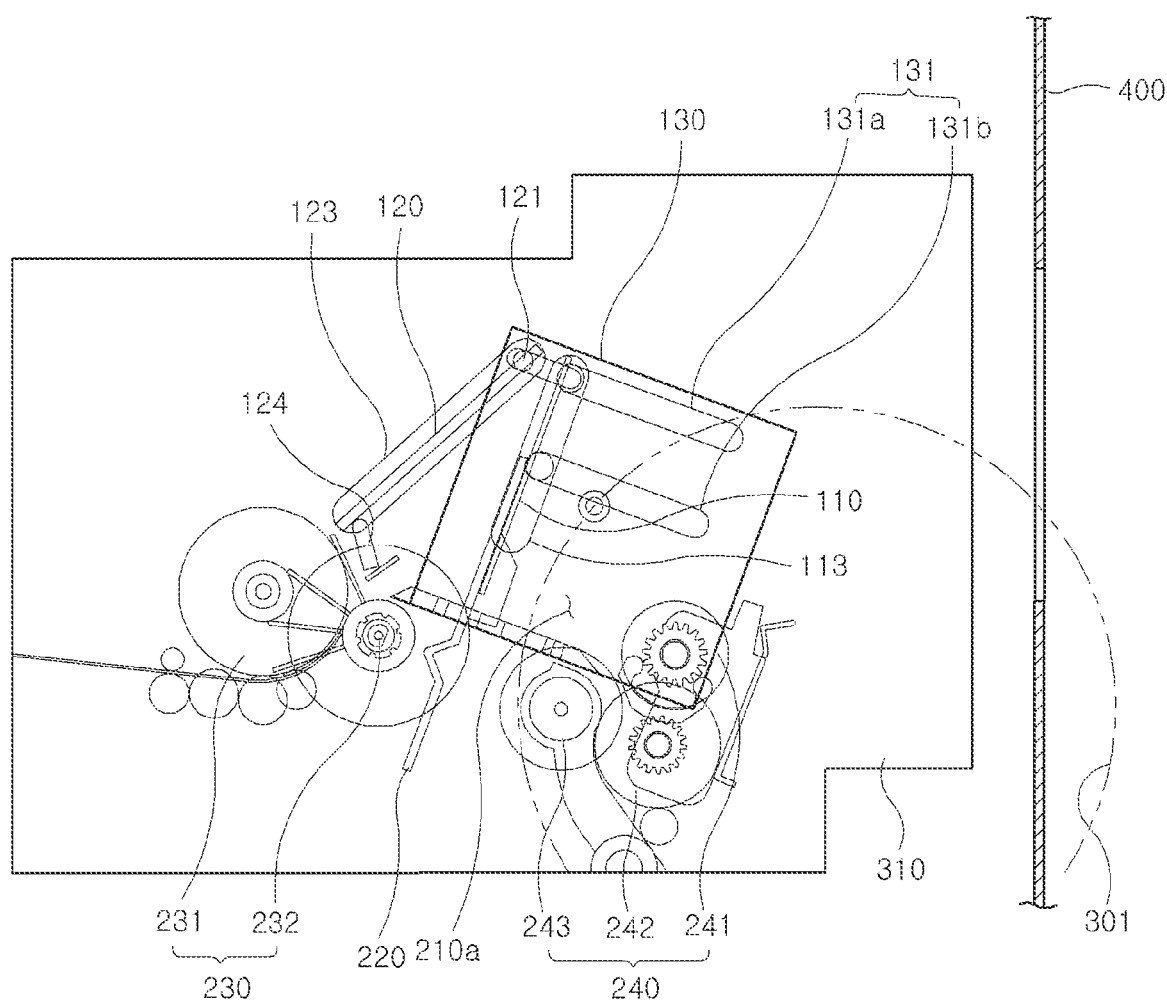
FIGS. 6A through 6D are operating condition diagrams showing a bill dispensing process of the bill receiving and dispensing apparatus according to the embodiment of the present invention.

FIG. 6A illustrates conditions before the bills B that have been in the piling unit 230 enter the piling space 210b.

The controller 600 controls the carriage unit 100 such that the front plate 110 is moved to the rear end of the front plate guide rail 131, whereby the front plate 110 can support bills, which are piled, at a position adjacent to the piling unit 230.

Here, the controller 600 may move the push plate 220 to a position adjacent to the separation unit 240 and cause the push plate 220 be on standby. Alternatively, the controller 600 may locate the push plate 220 at a position corresponding to a bill support surface of the front plate 110. In this embodiment, although the latter case is illustrated, the push plate 220 may be controlled such that it is moved along with the front plate 110.

As illustrated in FIG. 5D, the back plate 120 guides the bills which are inserted into the pocket 130 by the piling unit 230, after the back plate 120 has moved rearwards along the slot 132 and rotated by a predetermined angle.

Figure 6B:
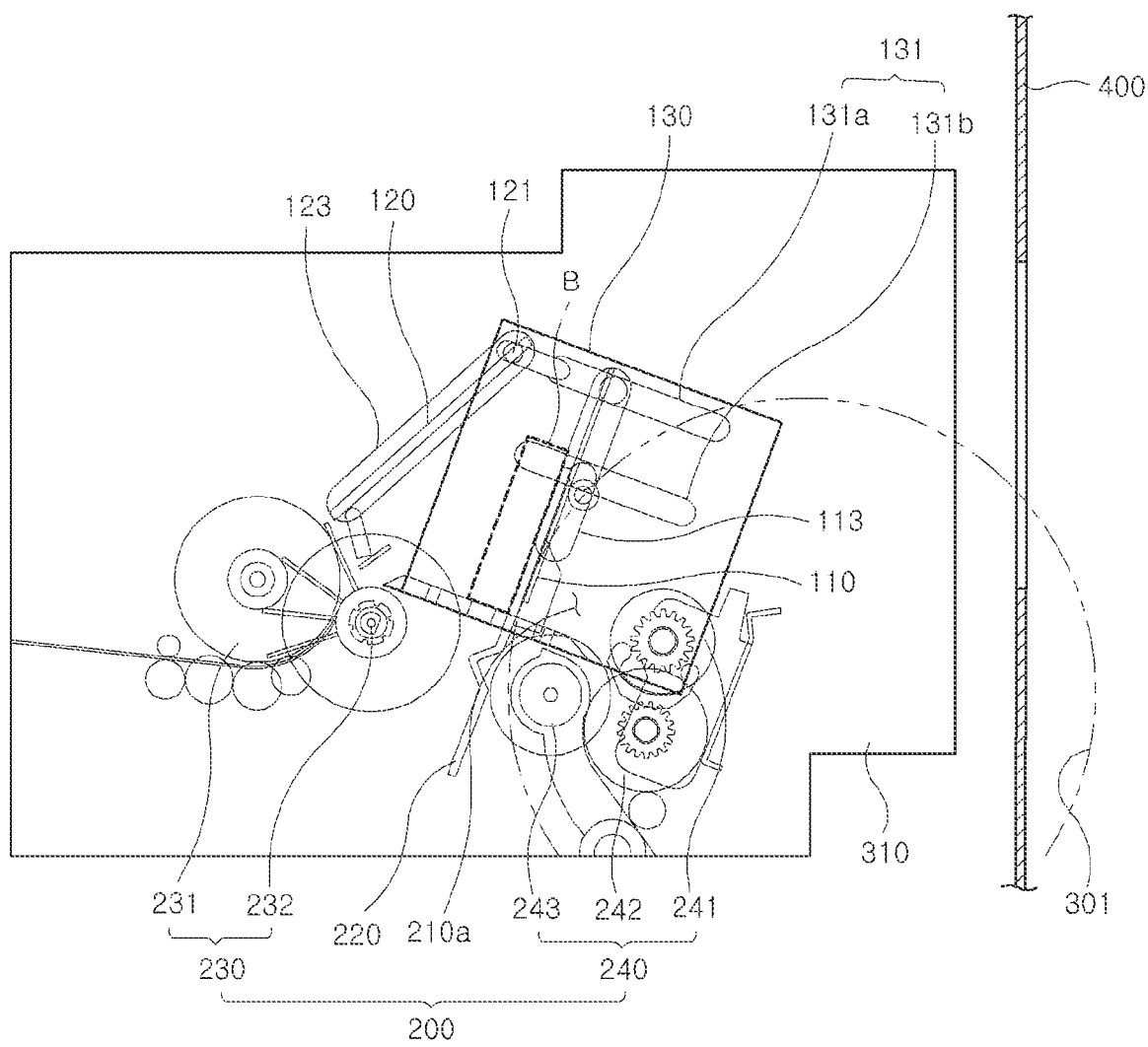

FIG. 6B illustrates conditions in which the bills B that have been transferred along the transfer path (not shown) are piled on the push plate 220 after being transferred to the piling space 210b by the transfer roller 231 and the sheet roller 232 of the piling unit 230.

Particularly, while the bills B are drawn into the piling space 210b by the piling unit 230, the controller 600 controls the carriage unit 100 so that the pulley 122 of the back plate 120 is rotated in the clockwise direction of FIG. 6B. Thereby, the back moving belt 123 is rotated in the direction opposite to the direction in which the bills B are drawn into the piling space 210b. The bills that are struck by the sheet roller 232 and thrown into the piling space 210b are brought into contact with the back moving belt 123. Then, the bills can be stably received in the piling space 210b. In other words, the piling performance can be enhanced by the rotation of the back moving belt 123.

Furthermore, the controller 600 controls the carriage unit 100 so that the size of the piling space 210b can be increased by moving the front plate 110 and the push plate 220 forwards depending on the amount of bills to be piled in the piling unit 230 or a value sensed by the bill pressure sensor 520. Of course, after the push plate 220 has been moved to the separation unit 240, it is sufficient if only the front plate 110 is controlled.

Figure 6C:
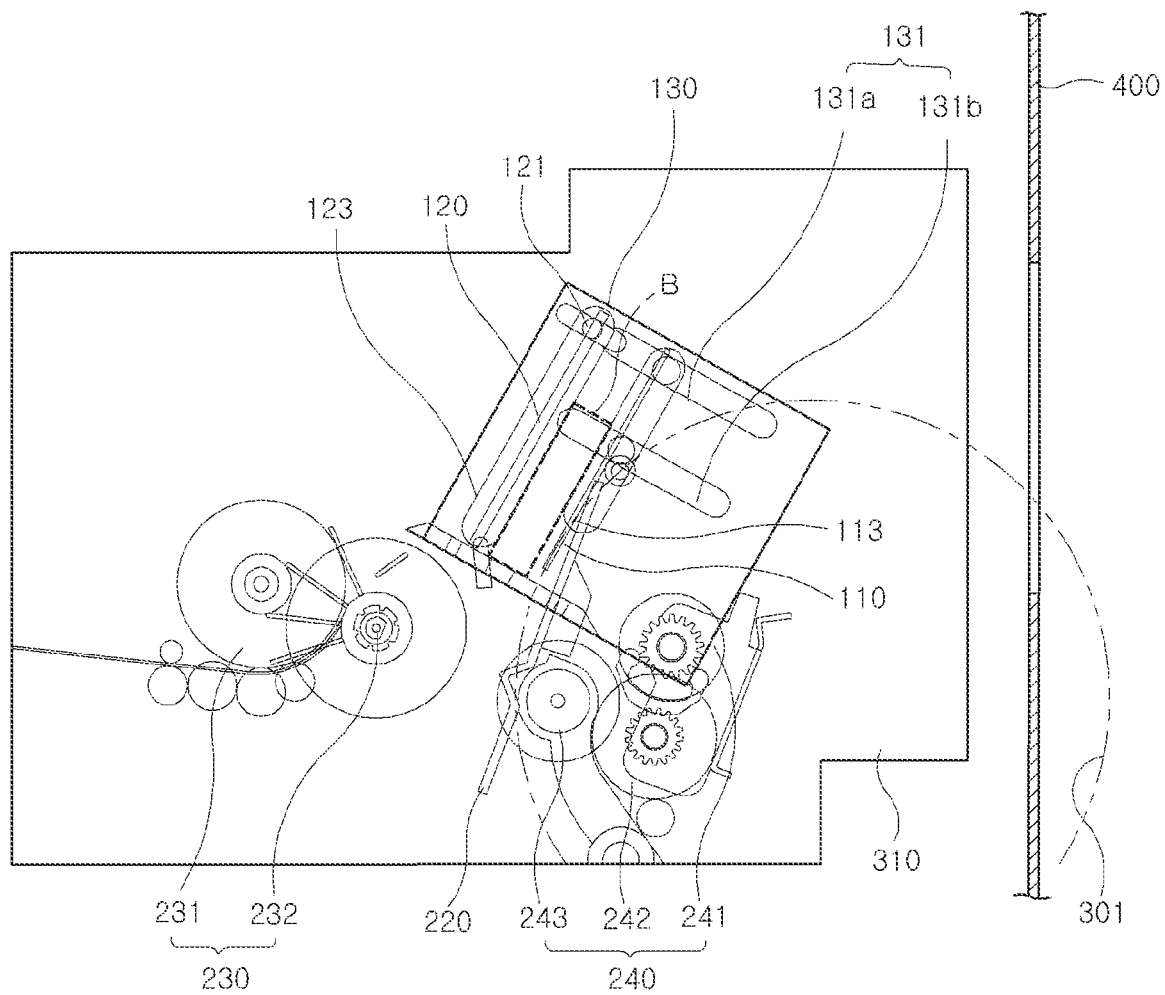

FIG. 6C illustrates conditions in which the carriage unit 100 is rotated in a clockwise direction and separated from the separation and piling unit 200.

When, as shown in FIG. 6B, the bills B are completely piled, the controller 600 operates the drive motor 320 of the carriage transfer unit 300 so that the carriage arm 330 is rotated.

Here, the controller 600 controls the carriage unit 100 and rotates the back plate 120 such that the back plate moving shaft 121 can move along the slots 132, in other words, each planar guide portion 125 can be inserted into the corresponding slot 132. Thereby, the back plate 120 and the front plate 110 can become parallel to each other. Thereafter, the back plate 120 is moved towards the front plate 110 along the slots 132.

As the carriage unit 100 rotates in the clockwise direction of FIG. 6C, the back plate 120 moves towards the front end of the slot 132 along the back plate deployment-trajectory slot 303b. The controller 600 controls the carriage unit 100 so that the front plate 100 is moved to clamp the bills B between the back plate 120 and the front plate 110.

As the carriage unit 100 moves away from the separation and piling unit 200, the push plate 220 is removed from the pocket 130 through the insert hole 133. The end of the push plate 220 passes through the front slots 116 of the front plate 110 and is located ahead of the front plate 110.

Figure 6D:
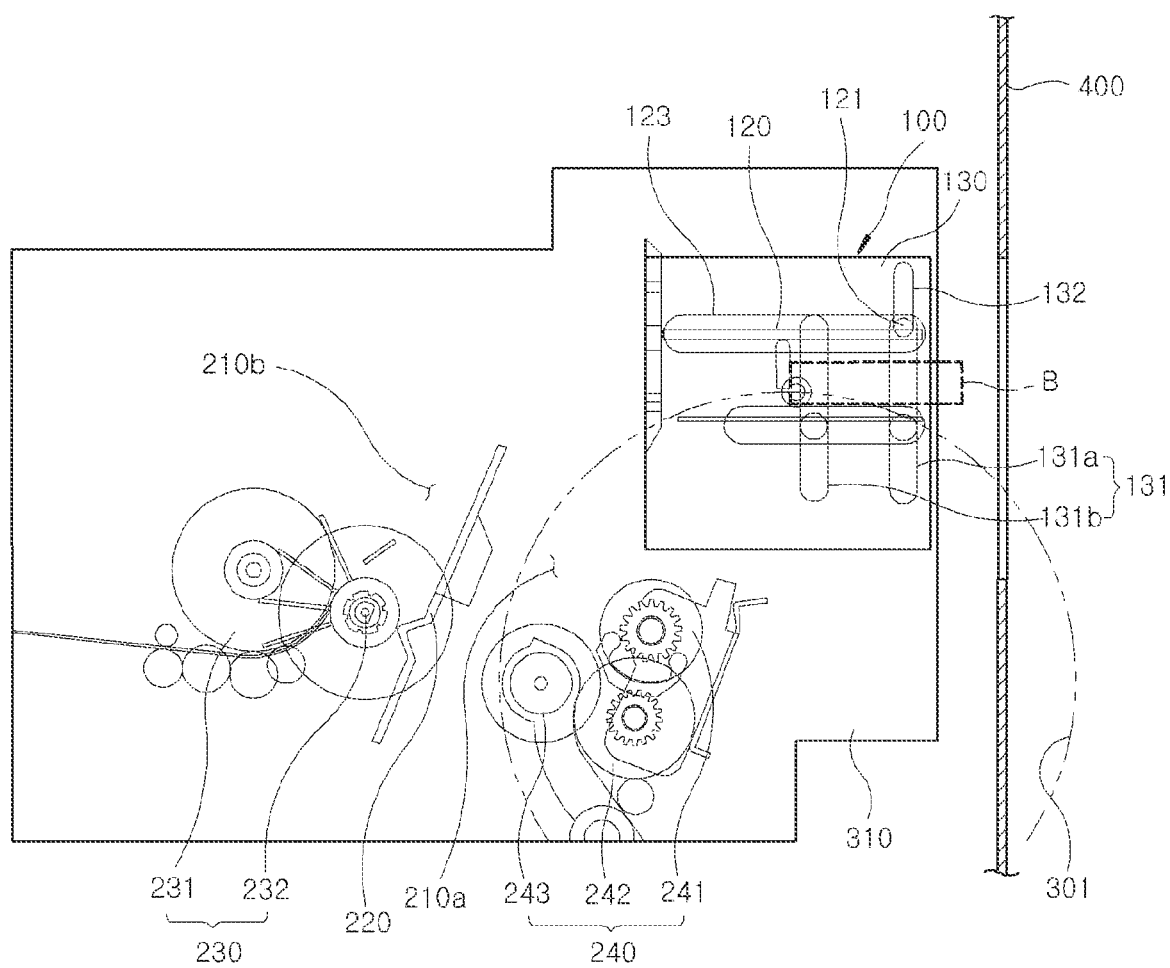

The controller 600 controls the rotation amount of the back moving belt 123 so that the pusher 124 provided on the back moving belt 123 supports the rear end of the bills B. Thereby, the bills B can not only be supported by the bottom plate 130b of the pocket 130 but also be supported by the pusher 124. Furthermore, the pusher 124 functions to push the rear end of the bills B at the withdrawal position FIG. 6D illustrates conditions in which the bills B are waiting to be withdrawn by the user after the rotation of the carriage unit 100 has completed.

Although this embodiment is configured such that when the withdrawal process is performed, the carriage unit 100 is disposed inside the casing 400 rather than being located at the bill receiving or dispensing port 410, the carriage unit 100 may be located to be brought into contact with the bill receiving or dispensing port 410, as shown in FIGS. 5A and 5B.

The carriage unit 100 into which the bills B are drawn is moved to the bill receiving or dispensing port 410 along the trajectory 301 and then located at a position facing the bill receiving or dispensing port 410 to wait for withdrawal of the bills B.

The controller 600 controls the carriage unit 100 and moves the front moving belt 113 and the back moving belt 123 so that the bills B that have been clamped between the back plate 120 and the front plate 110 can be provided to the user through the bill receiving or dispensing port 410. Here, the pusher 124 pushes the rear end of the bills B to enable the user to more smoothly pull out the bills B.

FIGS. 7A through 7D are operating condition diagrams from one direction showing a bill rejection process of the bill receiving and dispensing apparatus according to the embodiment of the present invention. The bill rejection process of the bill receiving and dispensing apparatus according to the embodiment of the present invention will be explained in detail below.

In this embodiment, the bill rejection process means a process of returning bills to a user when the bills are determined by a discrimination unit (not shown) as being abnormal bills during the bill deposition and separation process or when the bill deposition process is canceled. In detail, the bill rejection process means a process of piling rejection bills in the piling space 210b and returning the rejected bills piled in the piling space 210b to the user through the bill receiving or dispensing port.

When the bill rejection process is conducted, only rejected bills may be returned or, alternatively, not only rejected bills but also non-separated bills that remain in the separation space 210a may be returned. As a further alternative, in response to requirement of the user or according to setting of the apparatus, bills that have been already normally separated may also be returned along with the rejected bills. In this case, the bills that have been already normally separated may be returned after being piled in the piling space 210b. When bill rejection is required, the range of kinds of bills to be retuned does not limit the spirit of the present invention.

In this embodiment, a process, in which when bills are received into the bill receiving and dispensing apparatus some of the bills are rejected and the rejected bills and non-separated bills are returned to the user, will be explained below.

Figure 7A:
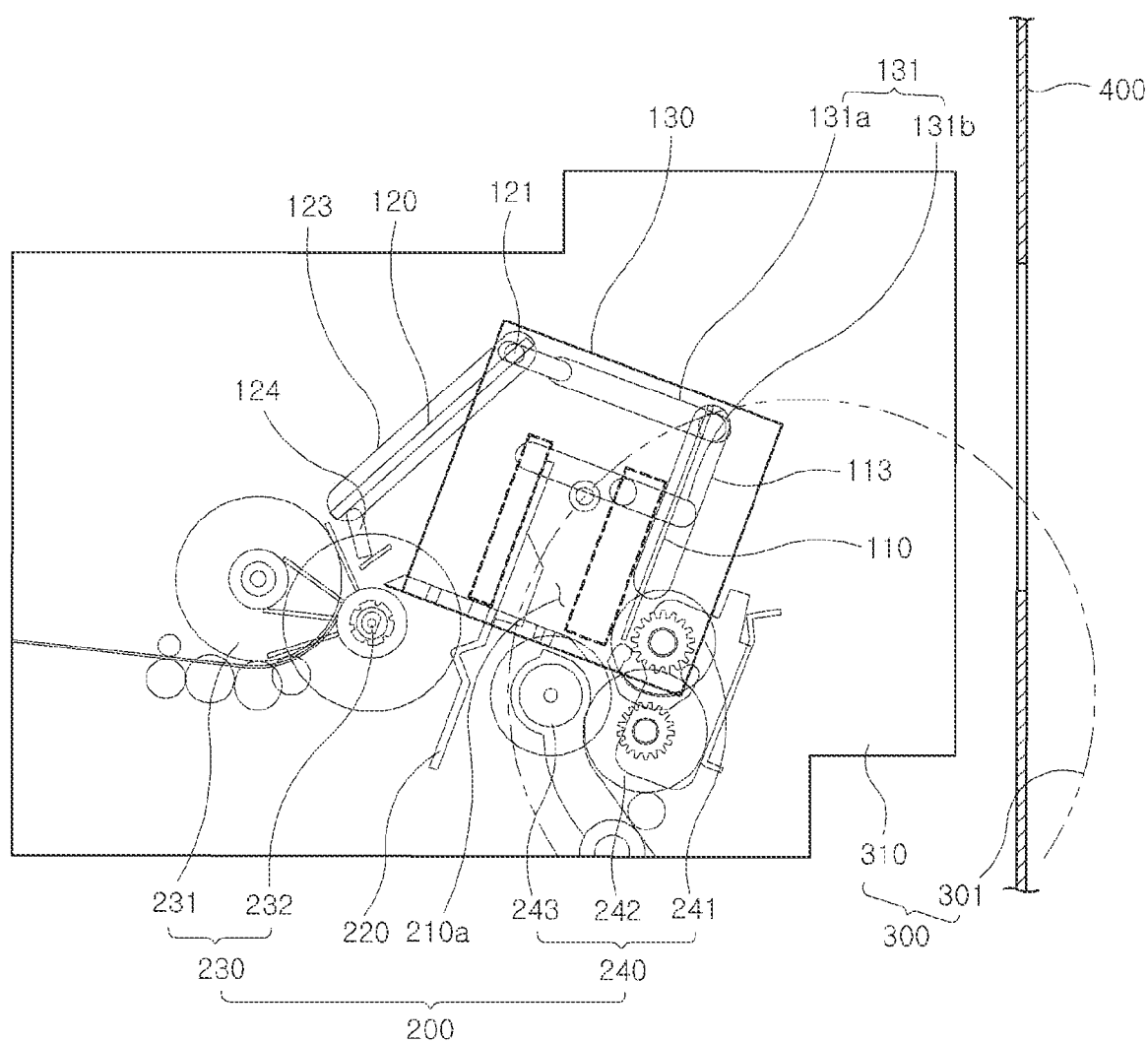
FIGS. 7A through 7D are operating condition diagrams showing a bill rejection process of the bill receiving and dispensing apparatus according to the embodiment of the present invention.

In detail, FIG. 7A illustrates conditions in which some bills are not yet separated and remain in the separation space 210a and the rejected bills are piled in the piling space 210b via a transfer path (not shown). Bills supported on the push plate 220 in the piling space 210b refer to bills to be rejected, and bills located in the separation space 210a refer to non-separated bills.

When the rejection process is conducted, the controller 600 controls the carriage unit 100 so that the push plate 220 stops the operation of pushing bills that are in close contact with the front plate 110 and moves towards the back plate 120 to support bills that are pilled in the piling space 210b.

When bills are piled in the piling space 210b, the back moving belt 123 rotates in the clockwise direction of FIG. 7A to apply frictional force to the bills in the direction opposite to the direction in which the bills are moved, thus enhancing the piling performance, as illustrated in FIG. 6B.

Figure 7B:
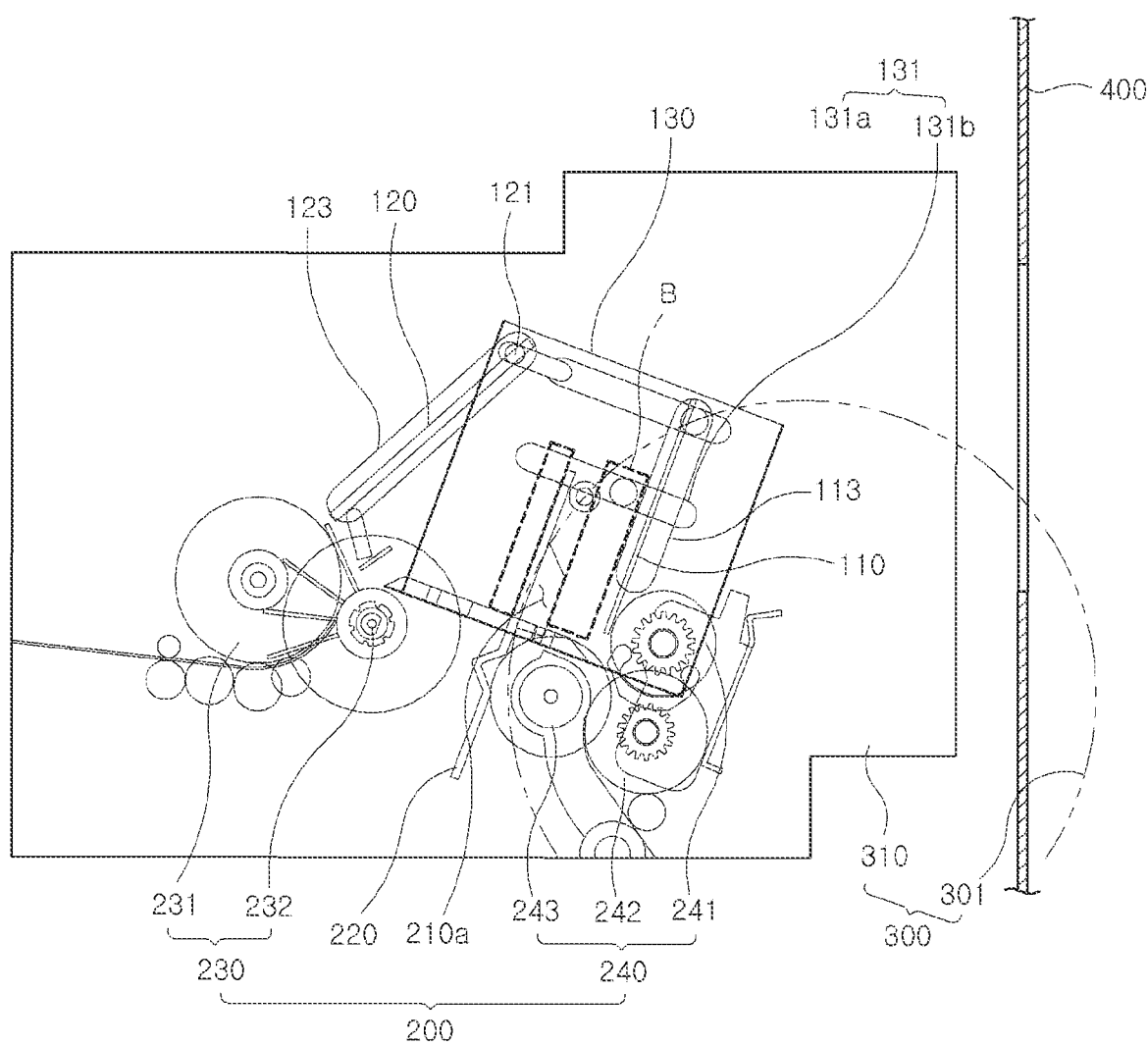

FIG. 7B illustrates conditions in which the push plate 220 moves towards the separation unit 240 and makes preparation for movement using the carriage unit 100.

When the operation of piling bills in the piling space 210b is completed, the controller 600 controls the carriage unit 100 so that the push plate 220 is moved towards the front plate 110 and the front plate 110 is moved towards the push plate 220, whereby the push plate 220 can be brought into close contact with bills B located in the separation space 210a.

If bills B are not present in the separation space 210a, the push plate 220 moves forwards through the front slots 116 of the front plate 110. Bills that are located in the piling space 210b of FIG. 7A and are already separated from each other are supported on the front plate 110.

Figure 7C:
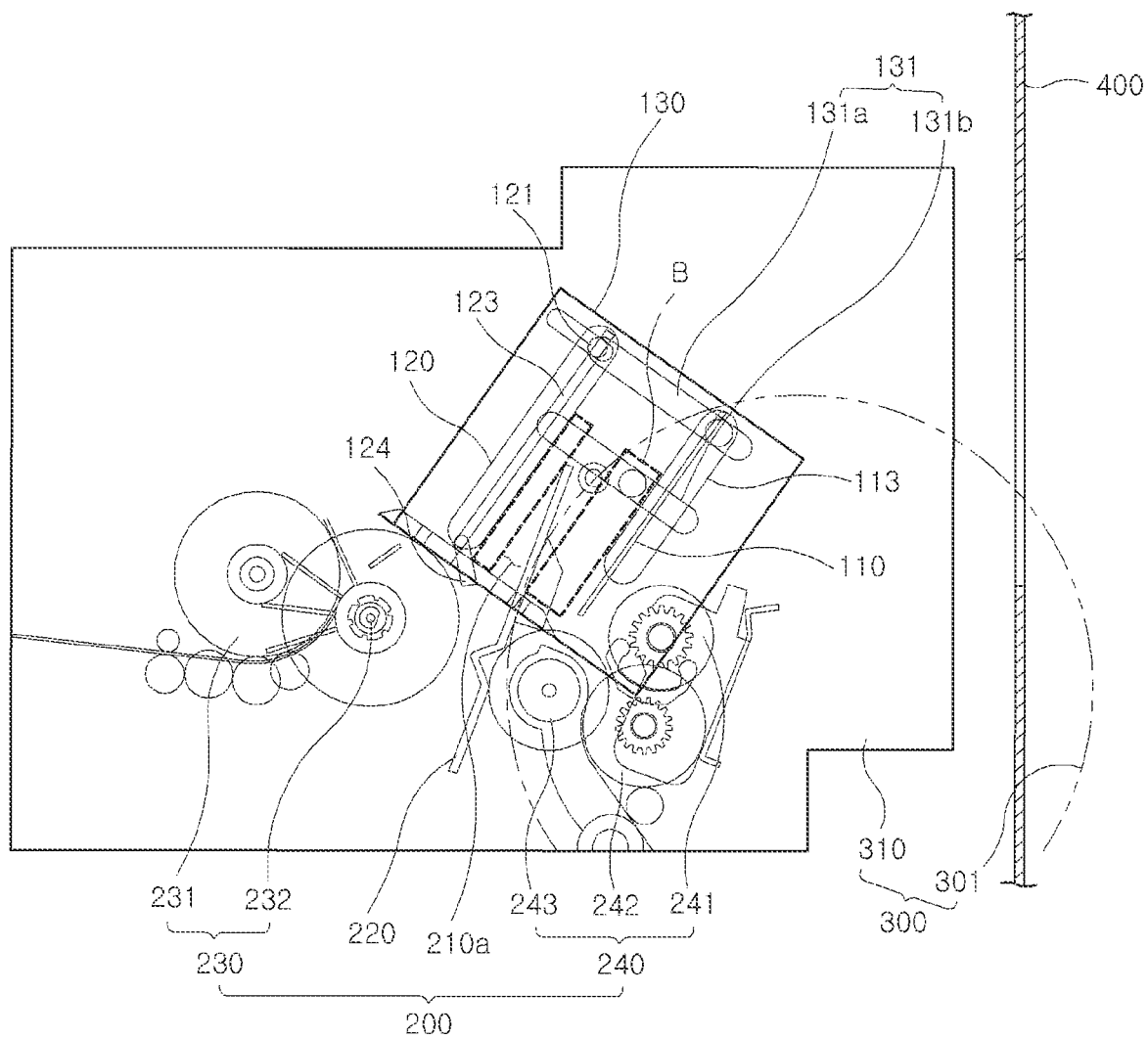

FIG. 7C illustrates conditions in which the carriage unit 100 is rotated by a predetermined angle towards the bill receiving or dispensing port 410.

As the carriage unit 100 rotates, the push plate 220 is moved out of the pocket 130 through the insert hole 133. The back plate 120 is also moved to the front end of the slot 132.

When the push plate 220 is completely removed from the insert hole 133, bills that have been located ahead of the push plate 220 are integrated with bills that have been located behind the push plate 220. The controller 600 controls the carriage unit 100 so that the front plate 110 is moved towards the back plate 120 to clamp the bills.

Figure 7D:
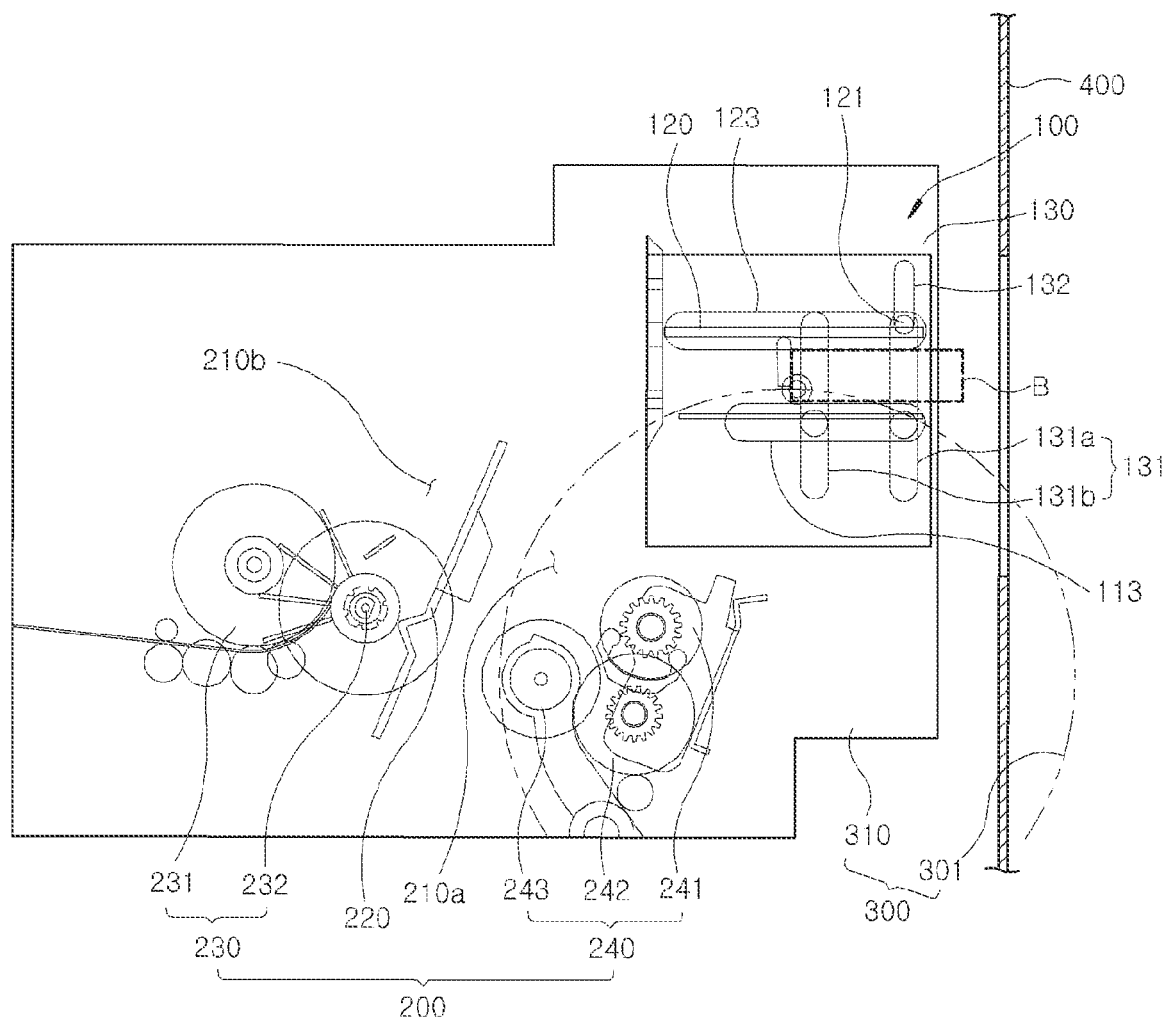

In this state, the carriage unit 100 is moved by the carriage transfer unit 300 to a returning standby position of FIG. 7D.

FIG. 7D illustrates conditions in which the carriage unit 100 is rotated forwards and the bills B are in the returning standby state.

Although this embodiment is configured such that when the returning process is performed the carriage unit 100 is disposed inside the casing 400 rather than being located at the bill receiving or dispensing port 410, the carriage unit 100 may be located to be brought into contact with the bill receiving or dispensing port 410, as shown in FIGS. 5A and 5B.

The carriage unit 100 into which the bills B are drawn is moved to the bill receiving or dispensing port 410 along the trajectory 301 and then located at a position facing the bill receiving or dispensing port 410 to wait for withdrawal of the bills B.

The controller 600 controls the carriage unit 100 and moves the front moving belt 113 and the back moving belt 123 so that the bills B that have been clamped between the back plate 120 and the front plate 110 can be provided to the user through the bill receiving or dispensing port 410. Here, the pusher 124 pushes the rear end of the bills B to enable the user to more smoothly pull out the bills B.

Hereinafter, a method of receiving and dispensing bills according to an embodiment of the present invention will be described in detail.

Figure 8:
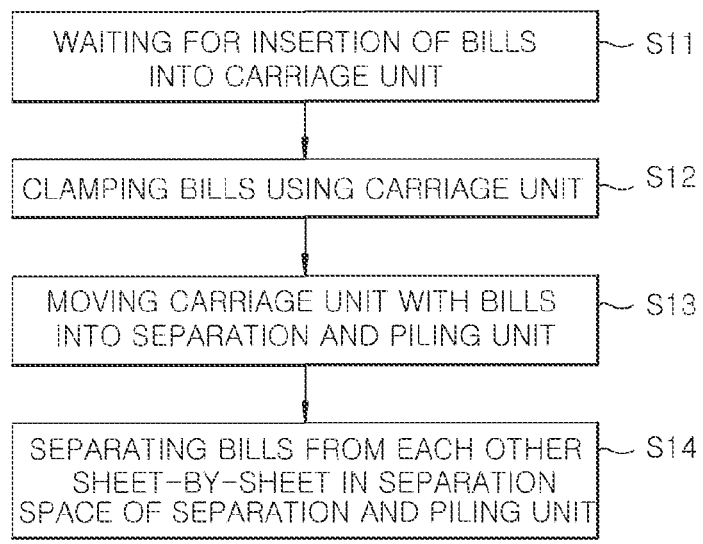
FIG. 8 is a flowchart illustrating a bill receiving operation of a method for receiving and dispensing bills according to an embodiment of the present invention.
Figure 9:
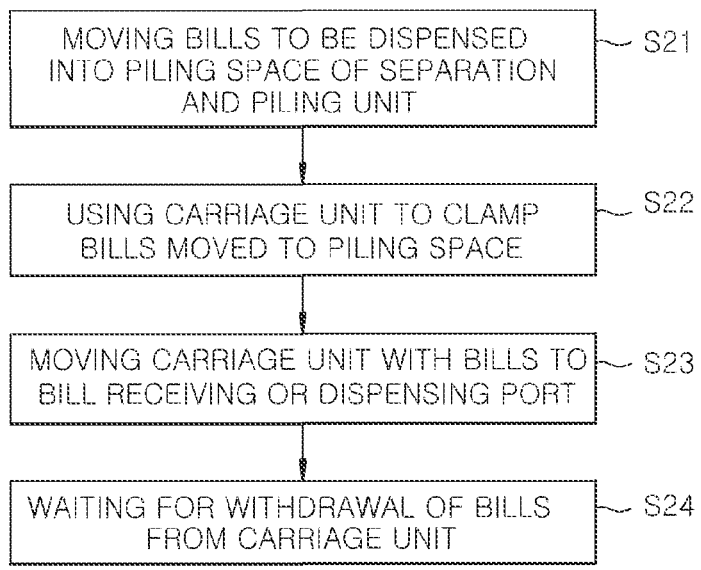
FIG. 9 is a flowchart illustrating a bill dispensing operation of the bill receiving and dispensing method according to the embodiment of the present invention direction.
Figure 10:
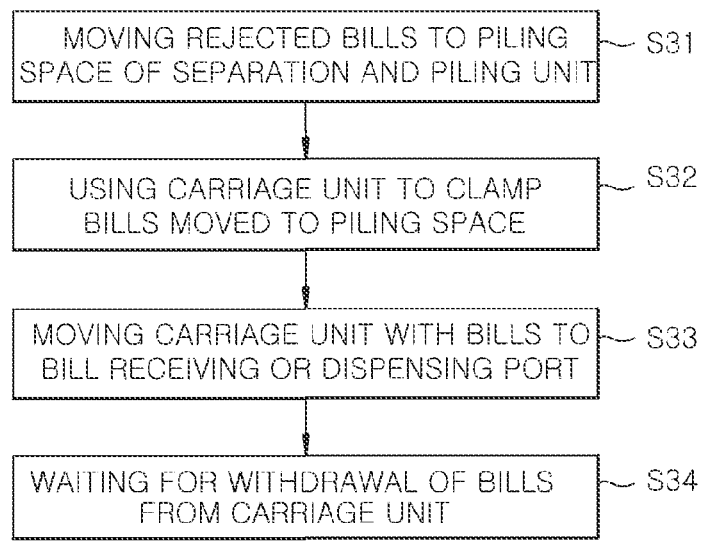
FIG. 10 is a flowchart illustrating a bill rejecting operation of the bill receiving and dispensing method according to the embodiment of the present invention.

FIG. 8 is a flowchart illustrating a bill receiving operation of a method for receiving and dispensing bills according to an embodiment of the present invention from one direction. FIG. 9 is a flowchart illustrating a bill dispensing operation of the bill receiving and dispensing method according to the embodiment of the present invention from one direction. FIG. 10 is a flowchart illustrating a bill rejecting operation of the bill receiving and dispensing method according to the embodiment of the present invention from one direction.

As shown in FIG. 8, the bill receiving method includes operation S11 of waiting for insertion of bills into the carriage unit 100 of the bill receiving and dispensing apparatus. Further, in operation S12, the bills are clamped by the carriage unit 100 after the bills are inserted into the carriage unit 100. Here, when the bills are inserted into the carriage unit 100, the trailing end of the bills are completely moved into the carriage unit 100, and the bills are arranged by pushing the trailing end of the bills before the bills are clamped.

After the bills are clamped in the carriage unit 100, in operation S13, the carriage unit 100 that clamps the bills moves along the trajectory in the bill receiving and dispensing apparatus and enters the separation and piling unit 200. In operation S14, the bills that enter the separation and piling unit 200 are separated individually from each other sheet-by-sheet in the separation space 210a.

As shown in FIG. 9, in the bill dispensing method, bills to be dispensed are moved to the piling space of the separation and piling unit 200, in operation S21. In operation S22, the bills that have been moved to the piling space 210b are clamped by the carriage unit 100. Here, the trailing end of the bills that are inserted into the carriage unit is completely moved into the carriage unit 100, and the bills are arranged by pushing the trailing end of the bills before the bills are clamped.

After the bills are clamped by the carriage unit 100, the carriage unit 100 that contains the bills is moved along the transfer path to the bill receiving or dispensing port 410, in operation S23. The carriage unit 100 waits for removal of the bills from the carriage unit 100, in operation S24.

In this embodiment, although the carriage unit 100 has been illustrated as clamping bills before moving to the bill receiving or dispensing port 410, the spirit of the present invention is not limited to this. For example, as shown in FIGS. 6A through 6D, after the carriage unit 100 starts to move, bills may be clamped by the front plate 110 and the back plate 120 while the carriage unit 100 moves.

Meanwhile, as shown in FIG. 10, in a method of withdrawing rejected bills, the rejected bills are moved to the piling space 210a of the separation and piling unit 200, in operation S31. In operation S32, the bills moved to the piling space 210a are clamped by the carriage unit 100.

In operation S33, after the bills are clamped by the carriage unit 100, the carriage unit 100 which contains the bills moves along the transfer path to the bill receiving or dispensing port 410. In operation S34, the carriage unit 100 is on standby to return the bills that are located in the carriage unit 100.

In this embodiment, while the carriage unit 100 is illustrated as clamping the bills before moving to the bill receiving or dispensing port 410, the spirit of the present invention is limited to this. For example, as shown in FIGS. 7A through 7D, after the carriage unit 100 starts to move, the bills may be clamped by the front plate 110 and the back plate 120 while the carriage unit 100 moves.

As described above, according to an apparatus and method of receiving and dispensing bills according to the present invention, manufacturers for ATMs can provide a present type bill receiving and dispensing service in such a way that the bill receiving and dispensing apparatus according to the present invention is applied to a pocket type ATM.

In detail, the push plate 220, the separation unit 240 and the piling unit 230 of the separation and piling unit 200 can be provided by slightly modifying a bill receiving and dispensing apparatus of the pocket type ATM. Further, the present type bill receiving and dispensing service can be provided by adding the carriage unit 100 and the carriage transfer unit 300 to the pocket type ATM.

In other words, the manufacturers for ATMs have only to replace the bill receiving and dispensing apparatus with the bill receiving and dispensing apparatus according to the present invention so as to manufacture a present type ATM using the conventional transfer path structure of the pocket type ATM as it is.

Thereby, the manufacturers for ATMs can provide a variety of bill receiving and dispensing types of ATMs to consumers without manufacturing many kinds of ATMs having different structures corresponding to bill receiving and dispensing types.

As described above, although the present invention has been described in detail with reference to the embodiments and the accompanying drawings, the above-described embodiments are only illustrative of preferable examples of the present invention. Thus, the present invention is not limited to the embodiments, but the scope of the present invention should be construed by the claims and their equivalent concepts.

What is claimed is:

1. An apparatus for receiving and dispensing bills, comprising:
   a bill receiving or dispensing port provided in a casing forming an outer shape of an ATM (automated teller machine), the bill receiving or dispensing port configured to receive or dispense bills;
   a carriage unit comprising a pocket configured to clamp and deposit the bills received directly from the bill receiving or dispensing port, or clamp and transfer the bills to be dispensed through the bill receiving or dispensing port, the pocket defined by at least a front plate and a back plate movable relative to the front plate to receive and hold the bills between the first plate and the back plate, the front plate supporting the bills and comprising a rotatable front moving belt, the front plate configured to clamp the bills in conjunction with the back plate, the back plate comprising a rotatable back moving belt coming into contact with the bills;
   a separation and piling unit formed with separation space for holding the received bills to be separated into individual sheets, the separation and piling unit further formed with piling space for piling the bills to be dispensed;
   a carriage transfer unit configured to move the pocket between the bill receiving or dispensing port and the separation and piling unit along a trajectory; and
   a controller configured to control operation of the carriage unit, the separation and piling unit and the carriage transfer unit,
   wherein the separation and piling unit comprises a push plate partitioning the separation space from the piling space, the push plate being movable,
   wherein the pocket has an insert hole through which the push plate enters the pocket when the carriage unit is received in the separation and piling unit, and
   wherein when the carriage unit is received in the separation and piling unit, the separation space is defined by a space between the push plate and the front plate, and the piling space is defined by a space between the push plate and the back plate.

2. The apparatus of claim 1, wherein the controller is configured such that:
   when the bills are inserted into the carriage unit by the bill receiving or dispensing port, the carriage unit is moved to the separation and piling unit by the carriage transfer unit to separate the bills into the individual sheets; and when the bills to be dispensed are piled in the separation and piling unit, the carriage unit is moved from the separation and piling unit to the bill receiving or dispensing port by the carriage transfer unit and waits for withdrawal of the bills.

3. The apparatus of claim 1, wherein the pocket comprises a front plate guide rail for guiding movement of the front plate and is formed with a slot for guiding movement of the back plate, the slot extending in a same direction as the front plate guide rail extends, a back plate moving shaft provided on the back plate, the back plate moving shaft comprising a planar guide portion inserted into the slot, the planar guide portion coming into contact with an inner surface of the slot, an end of the slot providing space for rotation of the back plate moving shaft, the back plate rotating around the back plate moving shaft in a direction away from the front plate when the carriage unit is received into the separation and piling unit.

4. The apparatus of claim 1, wherein the back moving belt is provided with a pusher pushing the bills when the bills are received into or dispensed from the apparatus.

5. The apparatus of claim 1, wherein when the bills are piled in the separation and piling unit, the back moving belt rotates to apply frictional force to the bills in a direction opposite to a direction in which the bills enter the piling space.

6. The apparatus of claim 1, wherein the separation and piling unit further comprises:
a piling unit installed at a predetermined position in the piling space, the piling unit for piling bills, transferred along a transfer path, in the piling space; and
a separation unit installed at a predetermined position in the separation space, the separation unit for separating bills, drawn into the separation space, individually from each other sheet-by-sheet.

7. The apparatus of claim 6, wherein
the received bills that are clamped by the carriage unit and moved to the separation and piling unit are located in the separation space by guidance of the push plate and then brought into close contact with the front plate by movement of the push plate.

8. The apparatus of claim 7, wherein
the front plate has a front slot so that an end of the push plate can pass through the front plate,
the back plate has a back slot so that the end of the push plate can pass through the back plate, and
the end of the push plate passes through either the front slot or the back slot during a process of receiving or dispensing the bills.

9. The apparatus of claim 7, wherein the carriage transfer unit comprises:
a guide plate disposed on a side part of the carriage unit;
a drive motor providing drive force to move the carriage unit along the trajectory; and
a carriage arm connected at a first end thereof to the carriage unit, the carriage arm being connected at a second end thereof to the drive motor.

10. The apparatus of claim 9, wherein the guide plate has:
a carriage trajectory slot guiding movement of a carriage guide roller provided on a predetermined portion of the carriage unit;
a back plate trajectory slot guiding movement of a back plate guide roller connected to the back plate; and
an arm trajectory slot guiding movement of the carriage arm, wherein the carriage trajectory slot and the arm trajectory slot form curved lines having a same rotation center.

11. The apparatus of claim 10, wherein the back plate trajectory slot comprises:
a back plate curved-trajectory slot forming a curved trajectory and guiding the back plate guide roller; and
a back plate deployment-trajectory slot guiding the back plate guide roller such that when the carriage unit enters the separation and piling unit, the back plate guide roller moves along a slot formed in the pocket.

12. A method for receiving and dispensing bills, comprising:
disposing a pocket of a carriage unit at a position corresponding to a bill receiving or dispensing port of a casing of an ATM (automated teller machine) to directly receive bills from the bill receiving or dispensing port, the carriage pocket defined by at least a front plate and a back plate movable relative to the front plate to receive and hold the bills between the first plate and the back plate, the front plate supporting the bills and comprising a rotatable front moving belt and configured to clamp the bills in conjunction with the front plate, the back plate comprising a rotatable back moving belt coming into contact with the bills;
clamping the bills using the carriage unit when the reception of bills is sensed;
rotating the pocket of the carriage unit using a carriage transfer unit and moving the carriage unit to a separation and piling unit for separating the bills into individual sheets;
separating the bills received in separation space of the separation and piling unit into the individual sheets using a separation unit; and
transferring the separated bills to a transfer path,
wherein the separation and piling unit comprises a push plate removably inserted into the pocket, and
when the carriage unit enters the separation and piling unit, the push plate is inserted into the pocket, and when the carriage unit moves away from the separation and piling unit, the push plate is removed from the pocket.

13. The method of claim 12, further comprising:
piling the bills, transferred from the transfer path, in a piling space of the separation and piling unit using a piling unit of the separation and piling unit;
rotating the carriage unit using the carriage transfer unit from the separation and piling unit towards the bill receiving or dispensing port after piling the bills is completed; and
disposing the carriage unit, with the bills clamped by the carriage unit, at a position facing the bill receiving or dispensing port to wait for bill withdrawal of a user.

14. The method of claim 13, wherein the bills piled in the piling space by the piling unit are rejected-bills among the bills separated by the separation unit.

15. The method of claim 14, wherein the rejected-bills, along with bills that are not yet separated in the separation space, are discharged by the carriage unit.

16. The method of claim 12, wherein
the separation and piling unit comprises a push plate removably inserted into the pocket, and
when the carriage unit enters the separation and piling unit, the push plate is inserted into the pocket, and when the carriage unit moves away from the separation and piling unit, the push plate is removed from the pocket.

17. The method of claim 12, wherein the bills received in the carriage unit are clamped by the front plate and the back plate, and are guided by the push plate and located in the separation space when the carriage unit enters the separation and piling unit.

18. The method of claim 12, wherein when the carriage transfer unit rotates the carriage unit from the separation and piling unit to the bill receiving or dispensing port, the push plate is removed from the pocket, and the bills are clamped by the front plate and the back plate.

* * * * *